United States Patent [19]

Inafuku

[11] Patent Number: 5,881,509
[45] Date of Patent: Mar. 16, 1999

[54] SPIRAL STAIRCASE AND CONNECTING METALS FOR SPIRAL STAIRCASE

[75] Inventor: Nouzen Inafuku, Naha, Japan

[73] Assignee: Inafuku Construction Co., Ltd., Naha, Japan

[21] Appl. No.: 860,897

[22] PCT Filed: Nov. 22, 1996

[86] PCT No.: PCT/JP96/03435

§ 371 Date: Jul. 15, 1997

§ 102(e) Date: Jul. 15, 1997

[87] PCT Pub. No.: WO97/19237

PCT Pub. Date: May 29, 1997

[30] Foreign Application Priority Data

Nov. 23, 1995 [JP] Japan ................................. 7-329609
Jul. 31, 1996 [JP] Japan ................................. 8-202466

[51] Int. Cl.⁶ .................................................. E04F 11/032
[52] U.S. Cl. ......................... 52/187; 52/182; 52/655.1; 52/646; 52/720.2; 52/736.2; 403/403; 403/165; 403/170; 403/217; 403/230; 256/65
[58] Field of Search ............................... 52/182, 183, 187, 52/188, 655.1, 646, 720.2, 736.2; 403/403, 164, 165, 170, 217, 230, 231, 256, 260; 256/65

[56] References Cited

U.S. PATENT DOCUMENTS

| | | | |
|---|---|---|---|
| 424,533 | 4/1890 | Belles | 52/187 |
| 699,509 | 5/1902 | Finnegan | 256/67 |
| 839,846 | 1/1907 | Holden | 52/187 X |
| 1,316,155 | 9/1919 | Harrison et al. | 256/65 |
| 3,178,780 | 4/1965 | Booher | 403/260 |
| 3,278,209 | 10/1966 | Winikoff | 256/65 X |
| 3,418,770 | 12/1968 | Allmand | 52/187 |
| 3,733,055 | 5/1973 | Hughes, Jr. | 256/65 X |
| 4,208,038 | 6/1980 | Reid | 256/65 |
| 4,616,950 | 10/1986 | Morris | 256/65 X |
| 4,850,164 | 7/1989 | McLeod | 52/182 |
| 5,022,209 | 6/1991 | Kimura | 52/646 |
| 5,242,239 | 9/1993 | Hosokawa | 403/258 |
| 5,620,275 | 4/1997 | Novacek | 403/232.1 |
| 5,641,236 | 6/1997 | Hornung et al. | 256/67 X |
| 5,647,681 | 7/1997 | Chen | 256/67 X |

FOREIGN PATENT DOCUMENTS

| | | | |
|---|---|---|---|
| 498466 | 1/1920 | France | 403/217 |
| 217164 | 12/1909 | Germany | 403/231 |
| 448756 | 8/1927 | Germany | 403/165 |
| 910216 | 3/1954 | Germany | 52/182 |
| 2623484 | 12/1977 | Germany | 52/187 |
| 3641693 | 6/1988 | Germany | 52/187 |
| 4205855 | 9/1993 | Germany | 52/187 |
| 52-55029 | 4/1977 | Japan . | |
| 53-151215 | 11/1978 | Japan . | |
| 54-139222 | 10/1979 | Japan . | |
| 50-154623 | 6/1983 | Japan . | |
| 58-93123 | 6/1983 | Japan . | |
| 62-175133 | 11/1987 | Japan . | |
| 1-154718 | 10/1989 | Japan . | |
| 2-35142 | 2/1990 | Japan | 403/230 |
| 1519768 | 8/1978 | United Kingdom | 52/187 |

*Primary Examiner*—Carl D. Friedman
*Assistant Examiner*—Laura A. Callo
*Attorney, Agent, or Firm*—Kanesaka & Takeuchi

[57] ABSTRACT

A spiral staircase includes a shaft pole for the staircase, a plurality of arms spirally connected to the outer periphery of the shaft pole, treads fixed to the upper surface of each arm, a plurality of balusters fixed to the outside end portion of a plurality of arms in parallel with the shaft pole, and a plurality of handrails mounted and connected between the balusters pillars, wherein each of the arms is connected to the shaft pole by an arm connecting metal, each baluster is connected to each arm by a baluster connecting metal, and the baluster and the handrails are connected by a handrail connecting metal. Since the connecting metals are used for the connection between the shaft pole and the arms, between the arms and the balusters and between the balusters and the handrails, connection and assembly of the spiral staircase can be carried out easily, reliably and firmly without requiring skilled labor, and the cost of the production and high operation efficiency can be accomplished.

12 Claims, 27 Drawing Sheets

SPIRAL STAIRCASE AND CONNECTING METALS FOR SPIRAL STAIRCASE

FIELD OF THE INVENTION

This invention relates to a spiral staircase in a building and to a connecting metal for a spiral staircase used for assembling the spiral staircase, and especially to a spiral staircase which can be assembled and installed simply and with certainty without skilled labor and processing and which is suitable for wooden buildings, mainly houses, and to a connecting metal for the spiral staircase.

DESCRIPTION OF THE BACKGROUND ART

A staircase in a wooden building is normally assembled and installed using a conventionally traditional method of construction.

Various methods of construction are used in the installation of a staircase in a wooden building. Among them, the most complicated method for construction relates to the assembly of a spiral staircase, which can only be implemented with the aid of the techniques of a carpenter.

Specifically, a spiral staircase installed in a wooden building includes a complicated framework, and a number of wooden members, joints, and the like, which require assembly. Specific methods for processing and working are required for such a complicated assembly of a spiral staircase, resulting in the problems of inefficiency in operation, a prolonged construction period, high costs, and the like, because the techniques of a professional carpenter are needed for such operations.

This invention has been proposed to solve the problems of the prior art and has an object of providing a spiral staircase and a connecting metal for the spiral staircase. The staircase can be connected and assembled simply, with certainty, and firmly without special carpenters techniques by using metals for connecting a shaft pole with the arm which is a tread of the spiral staircase, connection of the arm with a baluster, and connection of the baluster with a handrail, whereby low costs and high efficiency in operation can be achieved.

DISCLOSURE OF THE INVENTION

This invention relates to a spiral staircase comprising: a shaft pole; a plurality of arms connecting spirally with the outer periphery of the shaft pole; treads secured to the upper surface of each arm; a plurality of balusters secured to each outer end of the arms in parallel with the shaft pole; and a plurality of handrails erected between and connected to the balusters; wherein each arm is connected to the shaft pole using an arm connecting metal; each baluster is connected with each arm using a baluster connecting metal; and each baluster is connected with each handrail using a handrail connecting metal.

The spiral staircase with this structure has the advantage that it can be simply assembled without any professional techniques and specific methods of processing and operation because, in the spiral staircase, the connection of the arm with the shaft pole, connection of the baluster with the arm, and the securing and connection of the handrail to balusters are implemented using metals.

This can solve the conventional problems of operational inefficiency, prolonged construction period, high costs, and the like.

Also, the present invention relates to a metal for connecting a shaft pole with a plurality of arms and with a plurality of balusters in a spiral staircase, comprising: a U-shaped metal formed of upper, back, and lower portions; and a pair of long bolts with one end of each being secured to the upper and lower portions respectively of the U-shaped metal and the other end being threaded and projecting from the back of the U-shaped metal; wherein a pair of through-holes is provided for inserting an anchor bolt at the upper and lower portions of the U-shaped metal; the U-shaped metals are located on both ends of the arm; both ends of the arm are inserted into the U-shaped metal and secured using the anchor bolt; and the long bolts penetrate the shaft pole and the baluster and are secured to connect the plurality of arms and the plurality of baluster to the shaft pole.

Further, the present invention relates to a metal for connecting a shaft pole with a plurality of arms and with a plurality of balusters in a spiral staircase, comprising: a pair of strap metals with one side being formed of a flat portion and the other side being formed of a screw; and a connecting plate integrating the pair of strap metals, the flat portions of the strap metals being opposed in parallel; wherein through-holes penetrating an anchor bolt are provided at each of the corresponding positions of flat portions of the pair of strap metals; the pair of strap metals is disposed on both sides of the arm; the upper and lower sides of the arm are clamped by the flat portions of the strap metals and secured by the anchor bolt; the portion of the strap metal excluding the flat portion penetrates the shaft pole and the baluster and is secured to connect the shaft pole to the pair of arms and to the baluster.

Furthermore, the present invention relates to a metal for connecting each of a plurality of balusters to the adjacent upper and lower handrails among a plurality of handrails in a spiral staircase, comprising: a trifid portion including shaft members which extend in three directions, the trifid portion consisting of a branch portion extending in a vertical direction and a branch portion extending in a longitudinal direction across the vertical direction at a fixed angle, these branch portions being united at the centers; and binding portions attached to each tip of the trifid portions; wherein at least one of the binding portions is attached to the tip of the trifid portion in a freely oscillating condition; among the binding portions, the binding portion attached to the branch portion extending in the longitudinal direction is secured to both the upper and lower ends of the adjacent upper and lower handrails; among the binding portions, the binding portion attached to the branch portion extending in the vertical direction is secured to the upper end of the baluster; to connect the baluster with the adjacent upper and lower handrails.

In the preferred embodiment of the present invention, the binding portions have the form of a bottomed cylinder, a bottomed bowl, or a plate.

The connecting metal for the spiral staircase of the present invention having this structure has the advantages that it can firmly support the arm and the baluster and can connect the arm and the baluster with the shaft pole simply and with certainty, whereby the reliability of the strength of the staircase is high.

Also, the connecting metal for the spiral staircase of the present invention is structurally simple so that an assembly operation is simple. Also, the connecting metal is generalized and the connecting metal itself is easily prepared at low cost.

DETAILED DESCRIPTION OF THE INVENTION AND PREFERRED EMBODIMENTS

The present invention will now be explained in detail with reference to the appended drawings.

<Spiral staircase>

First, an embodiment of the spiral staircase of the present invention will be explained with reference to FIG. 1.

Figure 1:
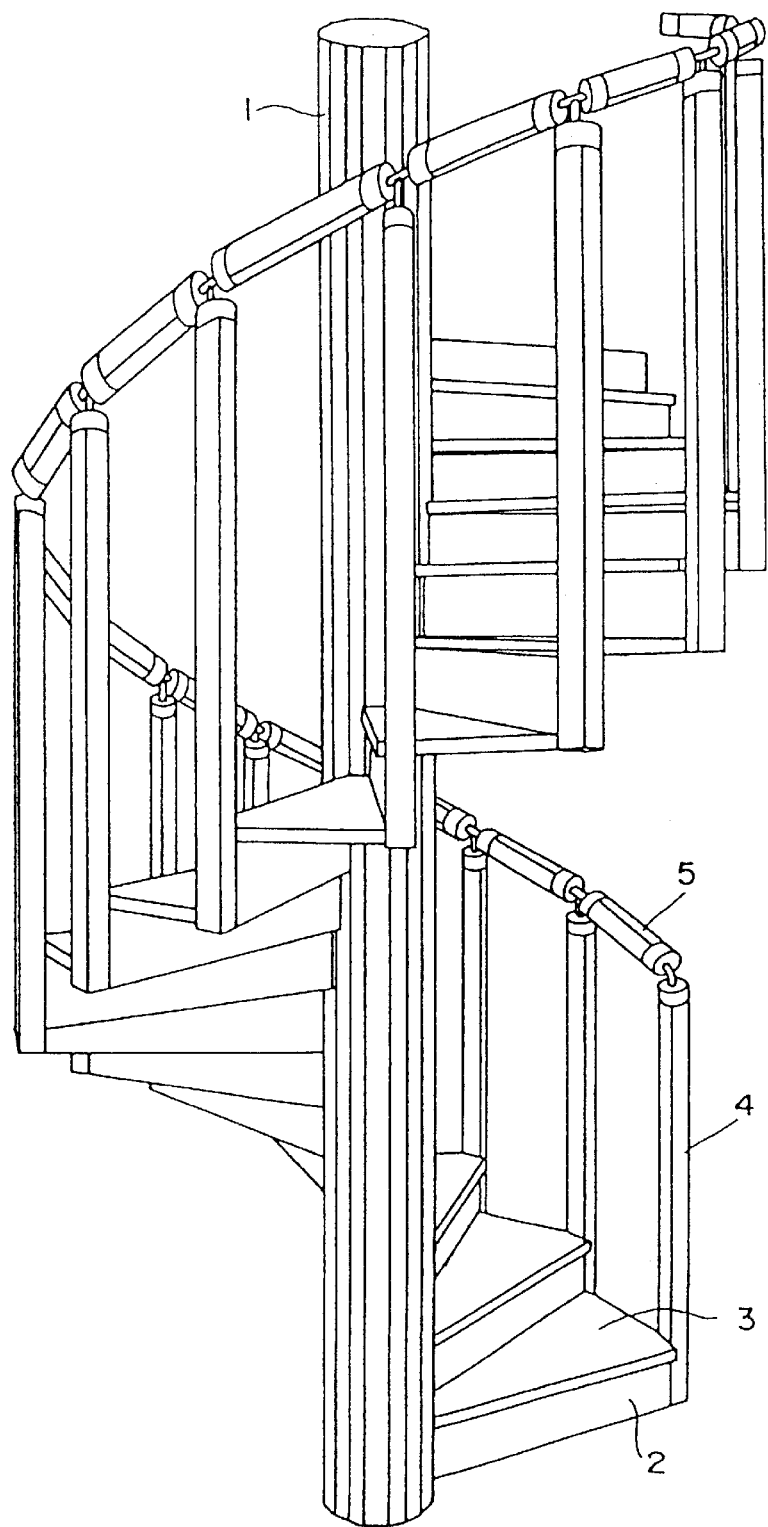
FIG. 1 is an over-all perspective view of a spiral staircase which is completely assembled.

FIG. 1 is an over-all perspective view of a spiral staircase which is completely assembled corresponding to the present invention.

As shown in FIG. 1, the spiral staircase is used in a wooden building. The symbol 1 represents a shaft pole which is the center of the spiral staircase and projects vertically from a floor.

The shaft pole 1 is circular or polygonal, e.g. hexadecagonal, in shape. A hexadecagonal shaft pole is used as the shaft pole 1 of the present invention as shown in FIG. 1.

The symbol 2 represents an arm. The arm 2 projects radially from the outer periphery of the shaft pole 1 and plural arms are spirally connected to the shaft pole 1. A tread 3 is mounted on and secured to the arm 2 and the back surface of the tread 3 is secured to the lower end of the next upper arm 2 to form the spiral staircase.

Each of the arm 2 is connected to the shaft pole 1 using an arm connecting metal as described below.

The symbol 4 represents a baluster. One baluster 4 is secured to the outer end of each arm 2 and is vertically oriented parallel to the shaft pole 1.

Each baluster 4 is connected to the arm 2 by a handrail connecting metal described below.

The symbol 5 is a handrail. The handrail 5 is formed into a linear columnar shape with the length corresponding to the erecting distance between the balusters.

Also, the handrail 5 is disposed on the upper end of the baluster 4, having an inclination of a fixed number of degrees and is erected between the balusters 4, whereby adjacent handrails 5 are interconnected on the balusters 4 to form a spiral handrail.

The baluster 4 and the handrail 5 are connected and secured by a handrail connecting metal described below.

Next, an embodiment of a arm connecting metal, baluster connecting metal, and handrail connecting metal for connecting the shaft pole 1 to the arm 2, the arm 2 to the baluster 4, and the baluster 4 to the handrail 5 respectively will be illustrated.

<Arm connecting metal>

(First Embodiment)

First, an embodiment of a arm connecting metal for connecting the shaft pole 1 to the arm 2 will be explained with reference to FIGS. 2 and 3.

Figure 2:
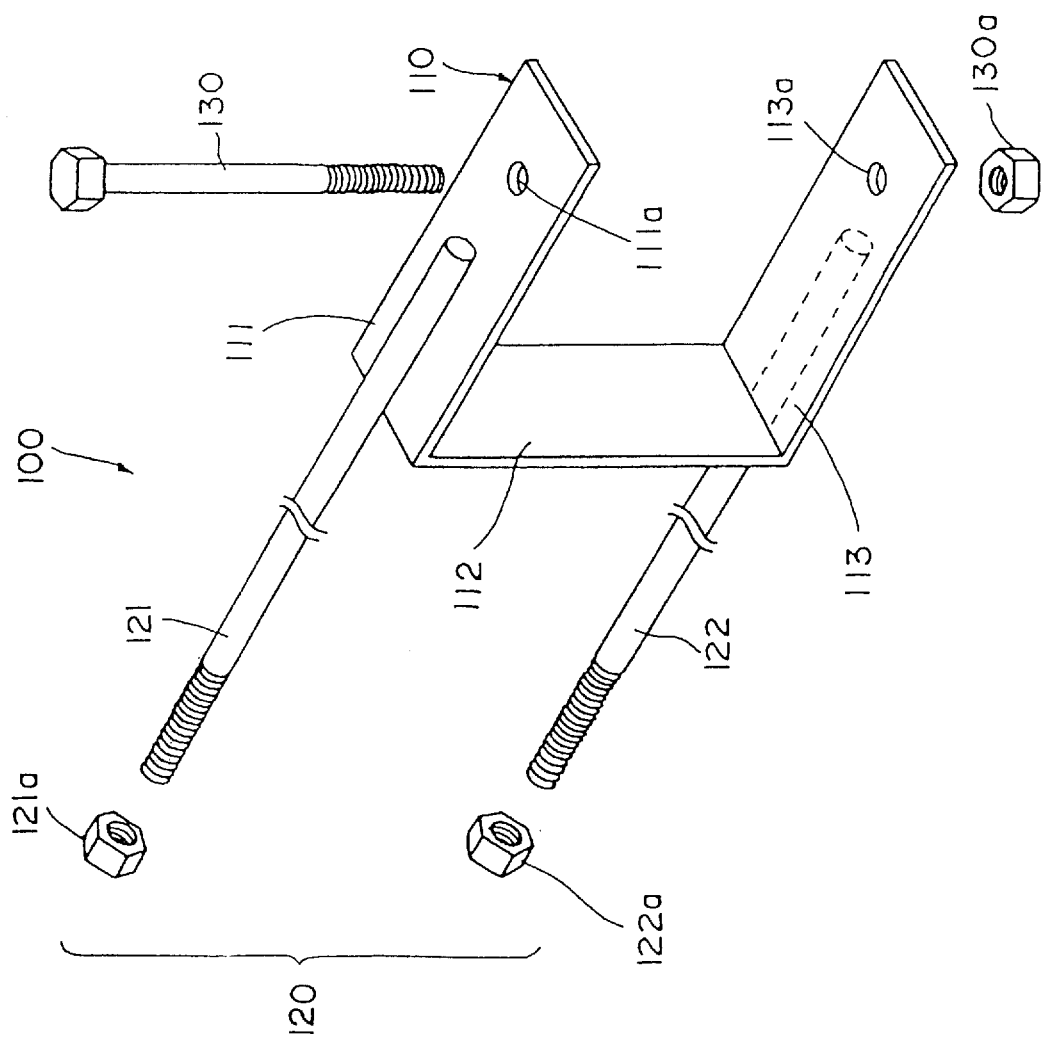
FIG. 2 is an over-all perspective view of an embodiment of a connecting metal for a spiral staircase according to the present invention, showing a first embodiment of a arm connecting metal.
Figure 3:
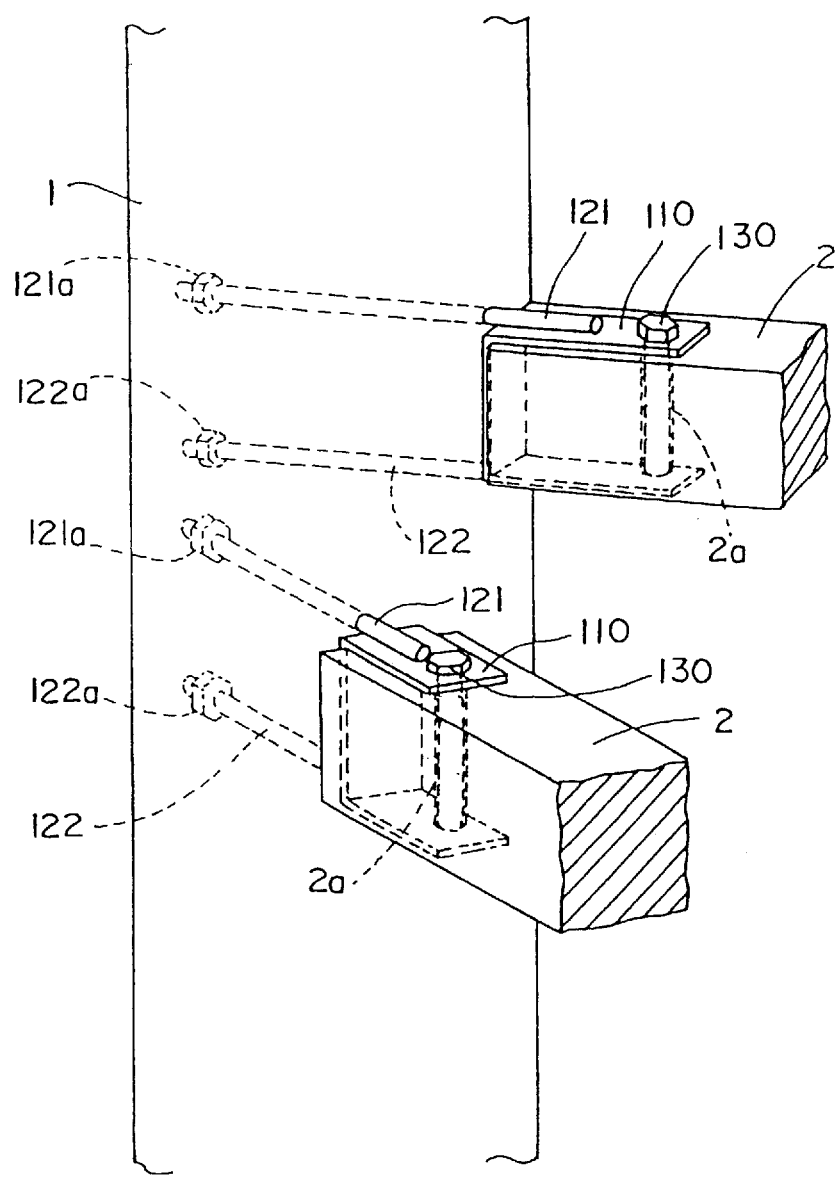
FIG. 3 is a perspective view of a main part showing the condition where a arm is connected to a shaft pole using the arm connecting metal shown in FIG. 2.

FIG. 2 is an over-all perspective view showing an arm connecting metal 100 of the present embodiment and FIG. 3 is a perspective view of a main part showing the condition where the arm 2 is connected to a shaft pole 1 using the arm connecting metal 100 shown in FIG. 2.

As shown in these figures, the arm connecting metal 100 of the present embodiment includes a U-shaped metal 110 formed by bending a plate material into a U-shape to provide an upper portion 111, back portion 112, and bottom portion 113; and a pair of long bolts 120 (121, 122). The side portions of the long bolts 120 are secured to the upper portion 111 and the lower portion 113 of the U-shaped metal 110. The other sides are provided with screws projecting from the sides of the back portion 112 of the U-shaped metal 110.

The upper portion 111 and the bottom portion 113 of the U-shaped metal of the arm connecting metal 100 are provided with a pair of through-holes 111a and 113a respectively penetrated by an anchor bolt 130.

Although the long bolts 120 are secured to the outer surfaces of the upper and lower portions 111, 113, a structure other than this may be acceptable if these bolts are attached to the U-shaped metal 110 at a specified distance apart.

For example, each of a pair of long bolt 120 may penetrate the back portion 112 of the U-shaped metal 110 and be secured to the inside of the upper and lower portions 111 and 113 respectively. Alternatively, these long bolts 120 may directly project from the back portion 112 of the U-shaped metal 110 to a specified distance. In addition, tapped holes for engaging bolts may be formed through the back portion 112 of the U-shaped metal 110 to secure the long bolt 120 to the back portion 112 by being secured through the tapped holes.

These structures offer the advantages that the long bolt 120 never projects from the upper and lower portions 111 and 113 so that the processing and securing of the arm 2 and the tread 3 are easy.

When the arm 2 is connected to the shaft pole 1 using the arm connecting metal 100 constructed in the above manner, as shown in FIG. 3, the arm 2 is first inserted into the U-shaped metal 110 and the anchor bolt 130 is caused to penetrate an anchor bolt through-hole 2a bored through the arm 2 in advance and is fastened with a nut 130a so that the arm 2 is secured to the arm connecting metal 1.

In this condition, the long bolts 120 penetrate the shaft pole 1 and are fastened with nuts 121a, 122a to firmly secure the arm 2 to shaft pole 1.

<Second Embodiment>

Next, a second embodiment of an arm connecting metal for connecting the shaft pole 1 to the arm 2 will be explained with reference to FIGS. 4 and 5.

Figure 4:
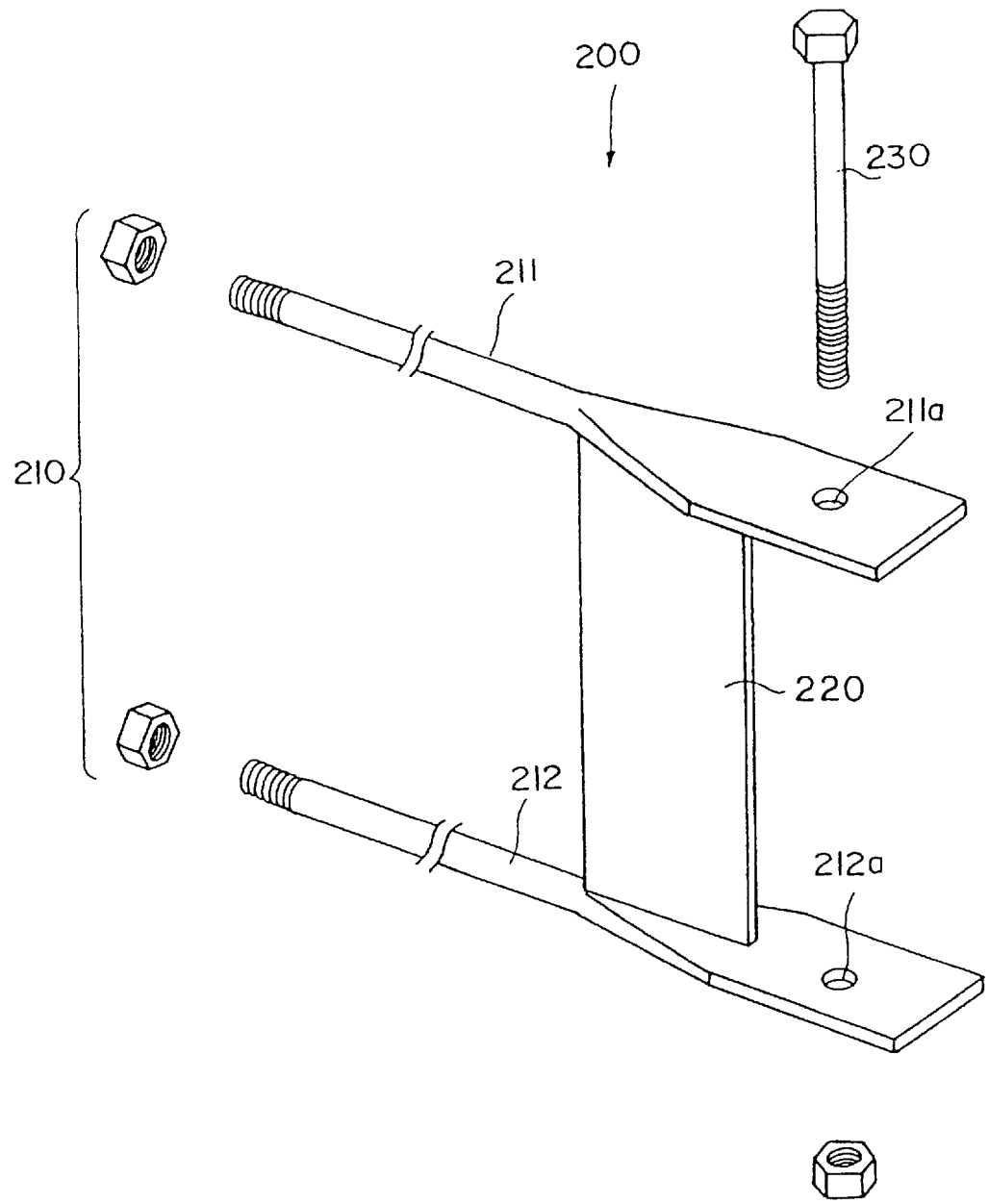
FIG. 4 is an over-all perspective view of an embodiment of a connecting metal for a spiral staircase according to the present invention, showing a second embodiment of a arm connecting metal.
Figure 5:
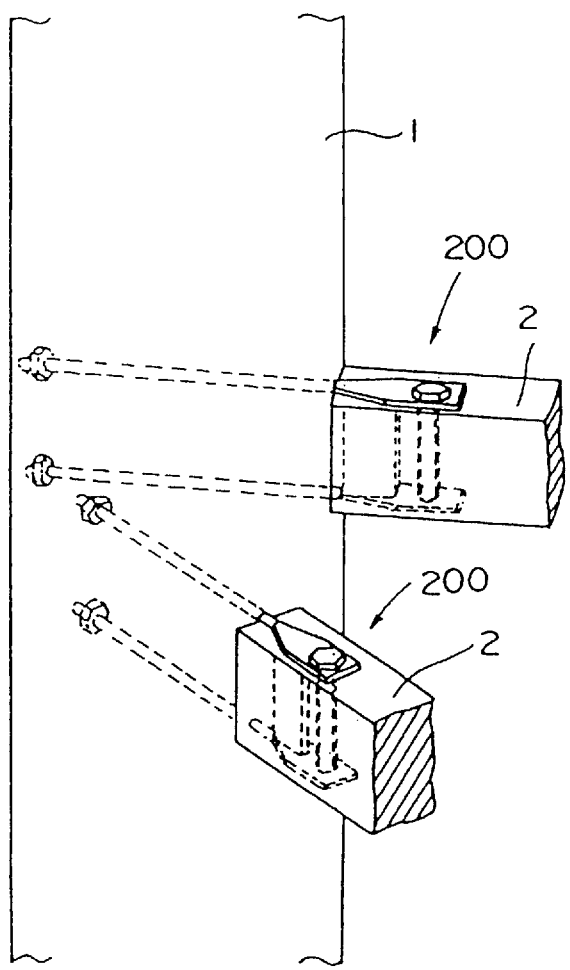
FIG. 5 is a perspective view of a main part showing the condition where a arm is connected to an shaft pole using the arm connecting metal shown in FIG. 4.

FIG. 4 is an over-all perspective view showing an arm connecting metal 200 of the present embodiment and FIG. 5 is a perspective view of a main part showing the condition where the arm 2 is connected to the shaft pole 1 using the arm connecting metal 200 shown in FIG. 4.

As shown in these figures, the arm connecting metal 200 of the present embodiment includes a pair of strap metals 210 (211, 212), each provided with a flat portion on one end and threaded on the other end.

A flat connecting plate 220 is provided between and secured to the strap metals 210 by welding or the like.

The strap metals 210 are integrally joined by the connecting plate 220, the flat portions being opposed in parallel, thereby forming one connecting metal as a whole.

The strap metals 210 are provided with through-holes 211a, 212a through which an anchor bolt 230 can penetrate at the corresponding positions on the flat portions.

As shown in FIG. 5, the top and bottom of the arm 2 are clamped between the flat portions of the strap metals 211, 212 while the connecting plate 220 is inserted into slit formed in the end of the arm 2 in advance, to secure the arm connecting metal 200 using an anchor bolt 230.

In this condition, the threaded portions of the strap metals penetrate the shaft pole 1 and are fastened with nuts to firmly secure the arm 2 to the shaft pole 1.

This arm connecting metal 200 of the present embodiment has the advantages that the arm 2 is simply and firmly connected to the shaft pole 1 by the integrated pair of strap metals 210 in a similar manner to the arm connecting metal 100 of the above-described first embodiment.

Figure 6:
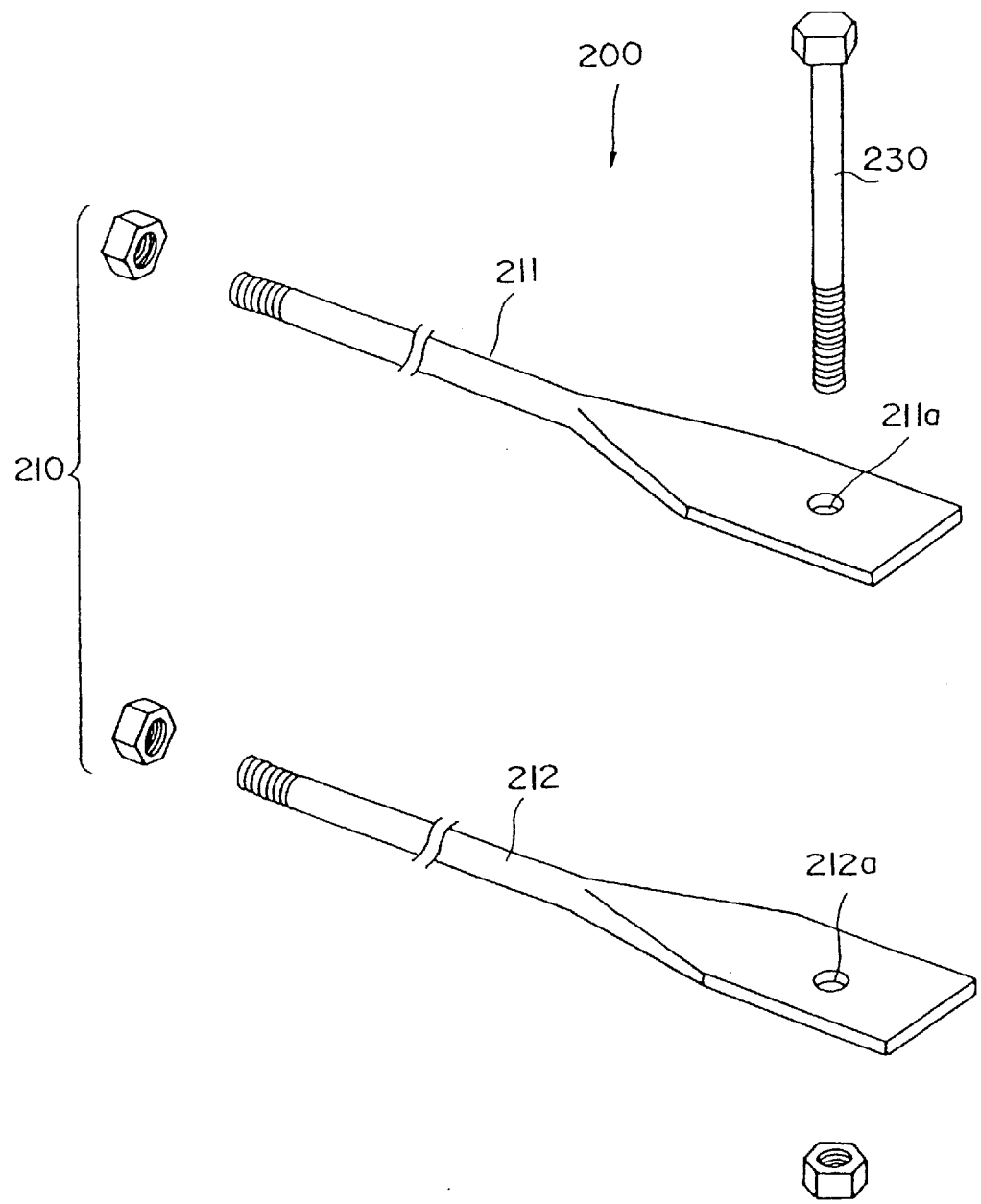
FIG. 6 is an over-all perspective view showing an alternate for the second embodiment of the arm connecting metal shown in FIG. 4.

As shown in FIG. 6, the connecting plate 220 may be omitted from the arm connecting metal 200 corresponding to the present embodiment.

When the connecting plate 220 is omitted in the above manner, the strap metals 210 are mutually independent, with the advantage that attachment to the arm 2 is easy and the metal can be manufactured simply at low cost.

In connecting the shaft pole 1 to the arm 2, the arm 2 may be connected with the arm connecting metal 100 after the arm connecting metal 100 (or 200) is first connected to the shaft pole 1, or the arm connecting metal 100 may be connected to the shaft pole 1 after the arm 2 is connected to the arm connecting metal 100.

<Baluster connecting metal>

Next, an embodiment of a baluster connecting metal for connecting the baluster 4 to the arm 2 secured to the shaft pole 1 will be explained with reference to FIGS. 7 and 8.

Figure 7:
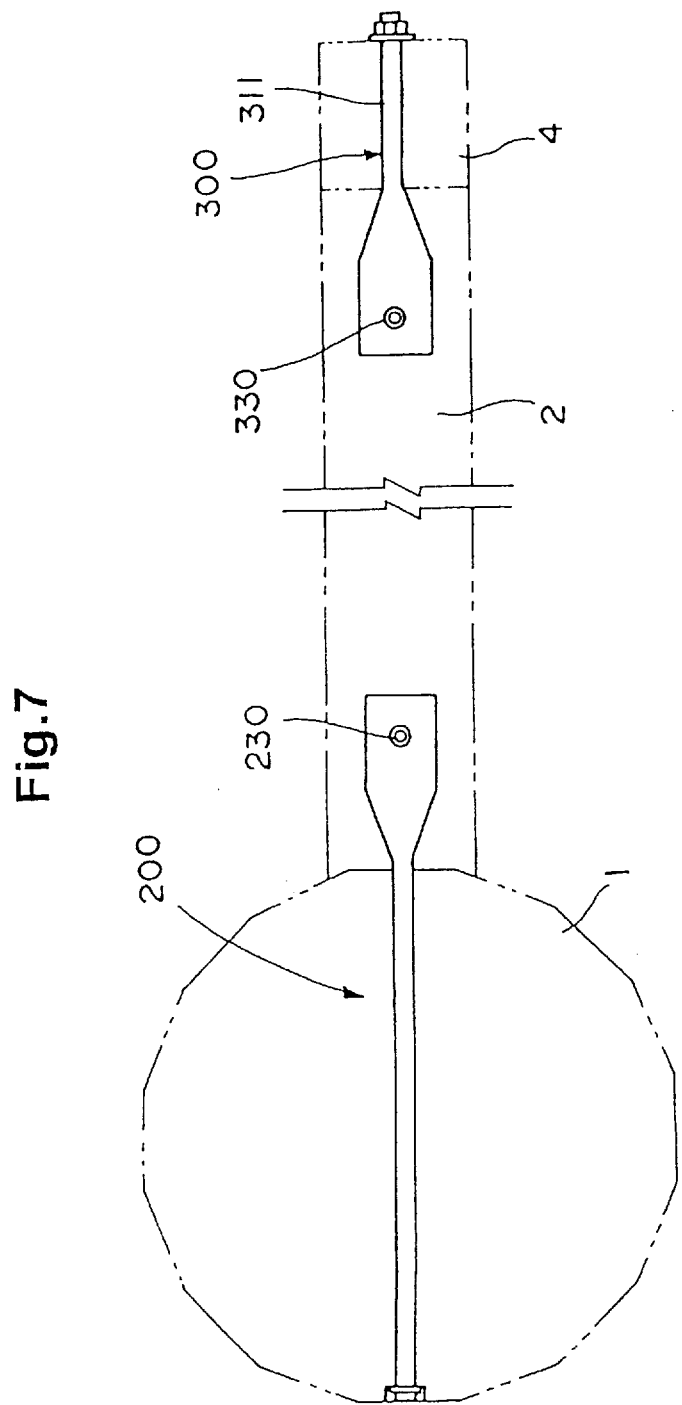
FIG. 7 is a schematic top plan view of an embodiment of a connecting metal for a spiral staircase according to the present invention, showing a structure in which a baluster is connected to the outer end of an arm secured to a shaft pole using an embodiment of a baluster connecting metal.

FIG. 7 is a top plan view schematically showing a structure in which the baluster 4 is connected to the arm 2 using a baluster connecting metal 300 corresponding to the present embodiment. FIG. 8 is the schematic front view.

The baluster connecting metal 300 of the present embodiment shown in these figures is structurally similar to the arm connecting metal 200. The baluster connecting metal 300 includes a pair of strap metals 310 (311, 312), each provided with a flat portion on one end and threaded on the other end and a flat connecting plate 320 integrally joining the strap metals 310. An anchor bolt 330 penetrates the flat portion of the strap metals 310.

Figure 8:
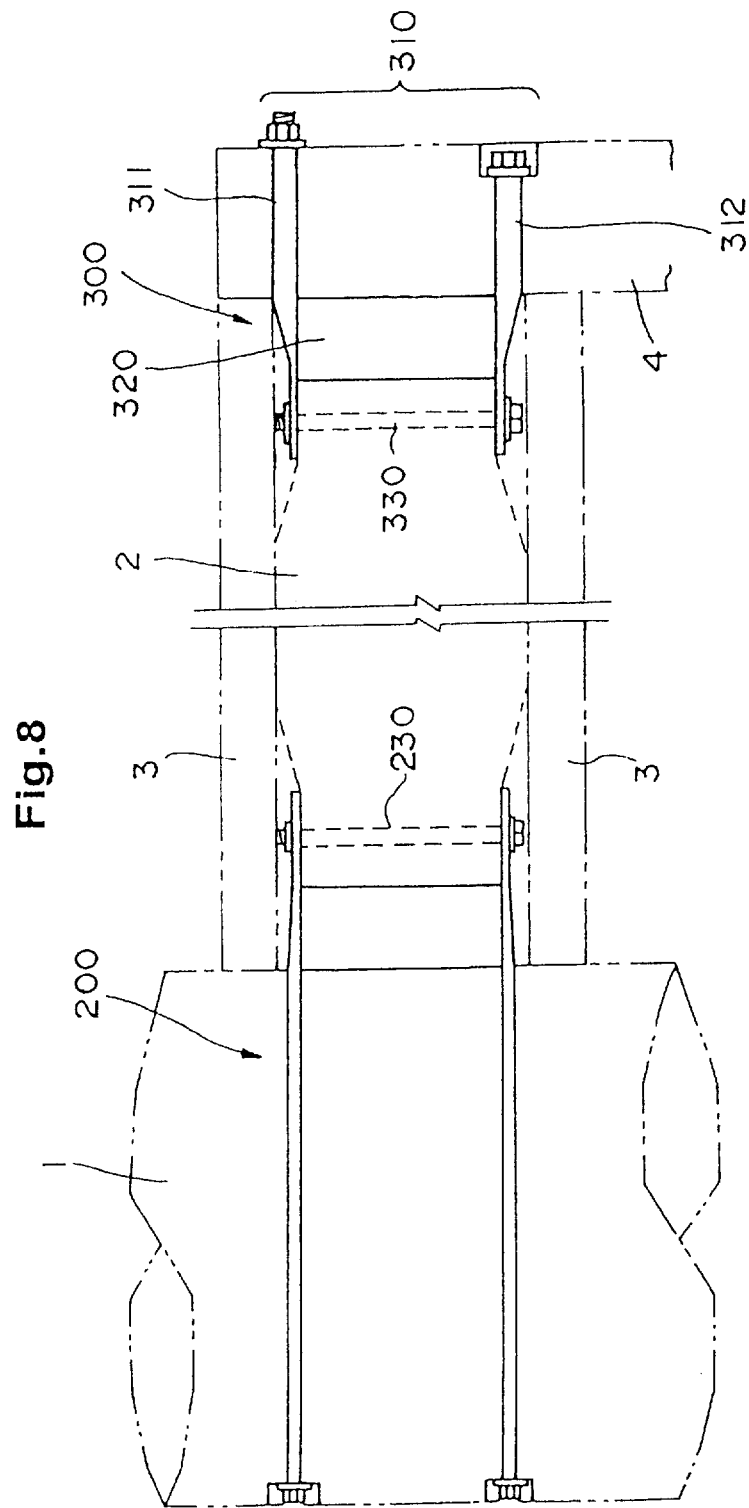
FIG. 8 is a schematic front view of an embodiment of a connecting metal for a spiral staircase according to the present invention, showing a structure in which a baluster is connected to the outer end of an arm secured to a shaft pole using an embodiment of a baluster connecting metal.

The above arm connecting metal 200 includes the strap metal 210 provided with the long threaded bolt to penetrate the shaft pole 1, whereas the baluster connecting metal 300 includes the strap metal 310 provided with a shorter threaded bolt long enough to penetrate the baluster 4 as shown in FIGS. 7 and 8.

Since the threaded bolt is shorter, the baluster connecting metal 300 is provided with a bolt larger in diameter than that of the arm connecting metal 200.

The connection of the arm 2 to the baluster 4 is implemented using the baluster connecting metal 300 of the present embodiment in the same manner as the arm connecting metal 200.

First, the outer end of the arm 2 is inserted between the upper and lower strap metals 311, 312 and the bolt 330 is inserted into through-holes opened in the flat portions of the strap metals 311, 312 and the outer end of the arm 2 and secured with nuts, whereby the outer end of the arm 2 is clamped and secured between the strap metals 311, 312.

Then, the bolts of the strap metals 311, 312 are inserted through the horizontal through-holes provided at the lower ends of the baluster 4 and secured with nuts, whereby the bottom of the baluster 4 is connected and secured to the outer end of the arm 2.

Either the connection of the handrail connecting metal 300 to the arm 2 or the connection of the handrail connecting 300 to the baluster 4 may be primarily implemented. Also, these connections may be implemented alternatively or in parallel, while inserting the bolt, lightly tightening the nut, and controlling the connecting condition, whereby the bolt is fastened and the baluster 4 is secured to the arm 2.

The baluster connecting metal 300 has a structure similar to the arm connecting metal 200 shown in FIG. 4 among the above-described arm connecting metals. As with the baluster connecting metal 300, metals similar to those shown in FIG. 2 or 6 may be used.

Also, usingalternates fortheabove armconnectingmetal, for example, a metal provided with a U-shaped metal with a back portion into which a separate bolt can be screwed and secured, the separate bolt may be screwed in from the outside of the baluster 4.

<Handrail connecting metal>

An embodiment of a handrail connecting metal for connecting the baluster 4 and the handrail 5 will be explained with reference to FIGS. 9 to 39.

(First Embodiment)

A first embodiment of a handrail metal will be illustrated with reference to FIGS. 9 to 19.

Middle handrail connecting metal

Figure 9:
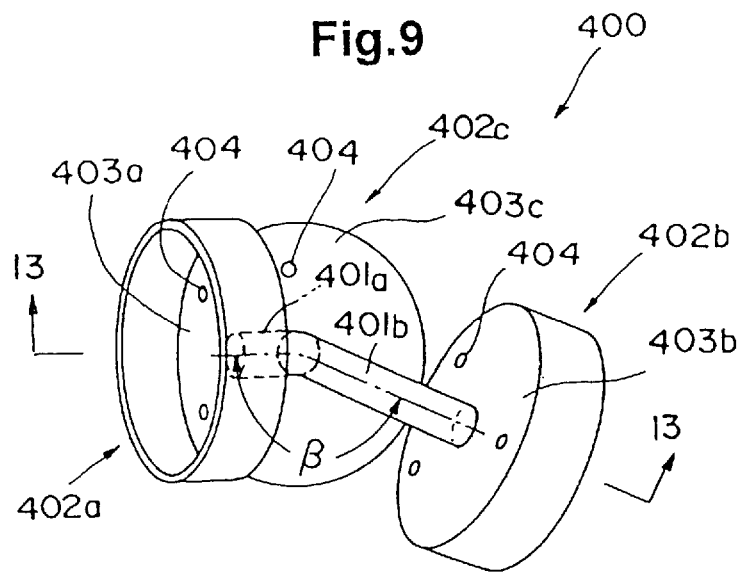
FIG. 9 is a top plan view of an embodiment of a connecting metal for a spiral staircase according to the present invention, showing a first embodiment of a middle handrail connecting metal for connecting adjacent upper and lower handrails to a baluster.
Figure 10:
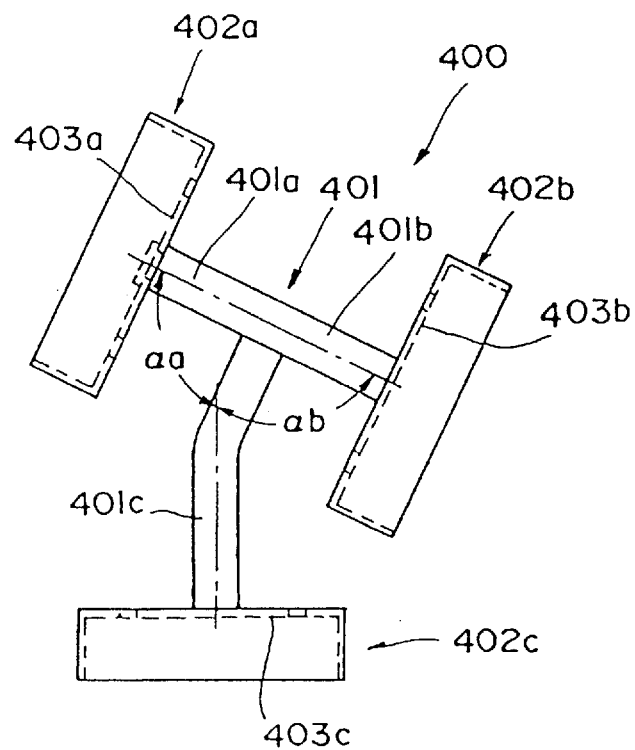
FIG. 10 is a front view of the middle handrail connecting metal shown in FIG. 9.

FIG. 9 is a top plan view showing a first embodiment of a middle handrail connecting metal for connecting adjacent upper and lower handrails 5 to a baluster 4. FIG. 10 is a front view of the middle handrail connecting metal.

Figure 11:
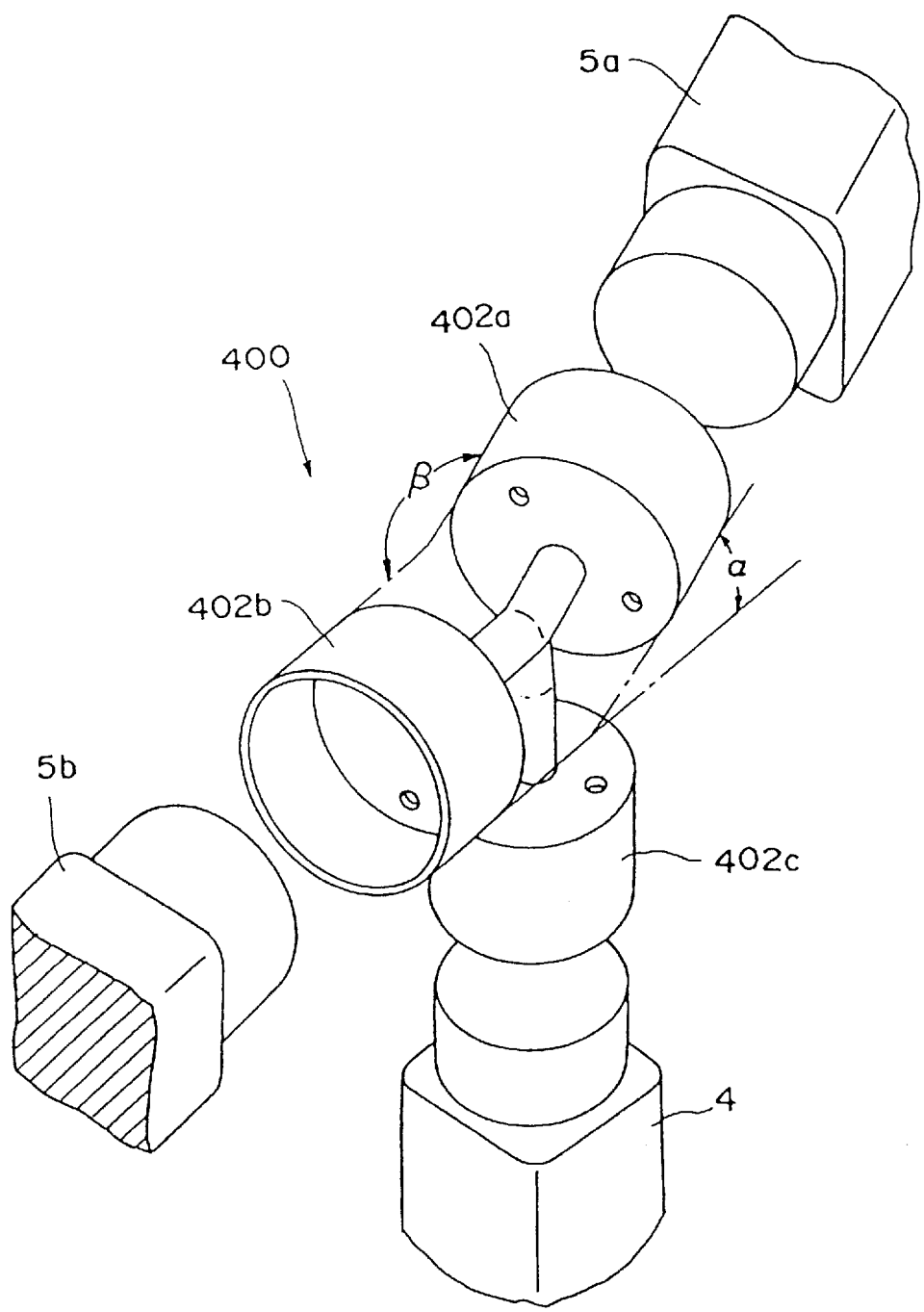
FIG. 11 is an exploded perspective view showing the case where a baluster is connected to a handrail using the middle handrail connecting metal shown in FIG. 9.

FIG. 11 is an exploded perspective view showing the case where the baluster 4 is connected to the handrail 5 using the handrail connecting metal shown in FIG. 9.

Figure 13:
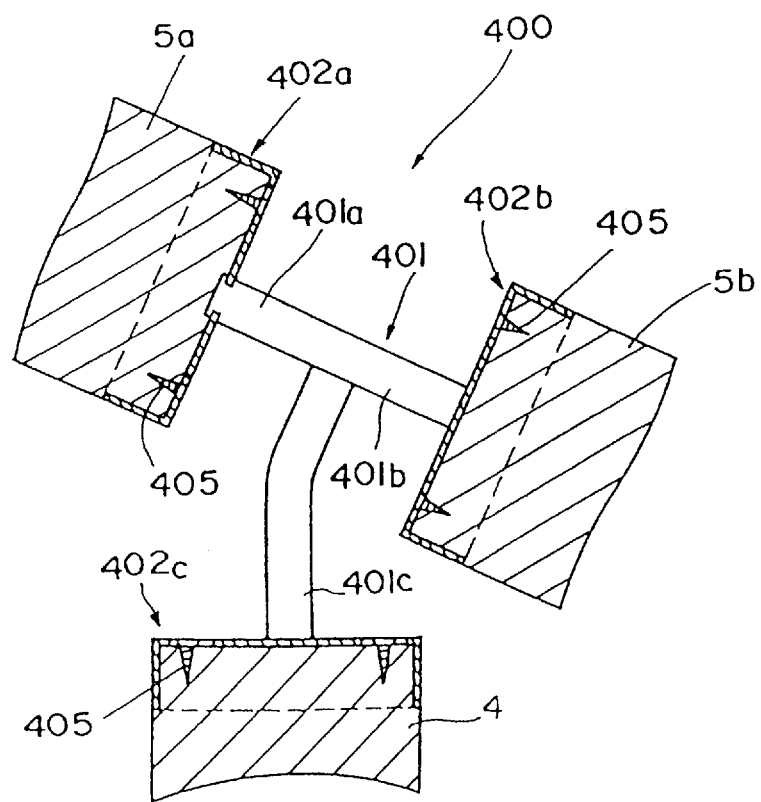
FIG. 13 is a sectional view taken along the line 13—13 in FIG. 9, showing the condition where a baluster is connected to a handrail using the middle handrail connecting metal shown in FIG. 9.

FIG. 13 is a sectional view taken along the line 13—13 in FIG. 9, showing the condition where a baluster 4 is connected to a handrail 5 using the handrail connecting metal shown in FIG. 9.

As shown in these figures, a handrail connecting metal 400 is a middle handrail connecting metal for connecting each of a plurality of balusters 4 with the adjacent upper and lower handrails among a plurality of handrails 5 in a spiral staircase, comprising a trifid portion 401 (401a, 401b, 401c) including shaft members which extend in three directions and binding portions 402 (402a, 402b, 402c) attached to the tip of each trifid portion.

The trifid portion 401 consists of the branch portions 401a, 401b, 401c which are formed of, for example, a reinforcing steel, which extend in three different directions, and which are integrated. In the present embodiment, the branch portion 401c of one reinforcing steel extending downward in a vertical direction is secured, by means of welding or the like, to the middle of the blanch portions 401a, 401b which are formed from one reinforcing steel section extending obliquely in the longitudinal direction. The branch portion 401c crosses the branch portions 401a, 401b at a specified angle and is integrated with these portions.

Here, as shown in FIG. 10, the slanting branch portions 401a, 401b connect with the downward branch portion 401c at right angles and the branch portion 401c is bent at the middle thereof so that the lower half thereof is vertically oriented.

On the other hand, as shown in FIG. 11, the slanting branch portions 401a, 401b are vertically bent at an angle aand also horizontally at an angle β.

Illustrating this more specifically, the trifid portion 401 is so designed that, as shown in FIG. 10, the angle α a formed at the point where the slanting branch portion 401a crosses the line extending from the vertical tip of the downward branch portion 401c is (90+α) degrees and the angle αb formed at the point where the slanting branch portion 401b crosses the line extending from the vertical tip of the downward branch portion 401c is (90−α) degrees.

Also, as can be seen in the top plan view of FIG. 9, a branch portion consisting of the branch portions 401a, 401b is bent so that the branch portion 401a crosses the branch portion 401b at angle β shown in FIG. 11, whereby the branch portions 401a, 401b are located at the angle along the circumferential direction of the staircase.

Bottomed binding portions 402a, 402b, 402c are attached respectively to the tips of the branch portions 401a, 401b, 401c of the trifid portion 401 formed in the above manner.

This binding portion 402 is cylindrical, provided with bottom plates 403a, 403b, 403c in the present embodiment. Each tip of the branch portions of the trifid portion 401 is attached to the center of each of the bottom plates 403a, 403b, 403c.

The three binding portions 402a, 402b, 402c are integrated at angles similar to those of the branch portions as shown in FIGS. 10 and 11 to constitute the handrail connecting metal 400 as a whole.

Although in this case screw holes 404 are formed in the bottom plates 403a, 403b, 403c of the binding portion 402, the screw holes 404 may be formed at the cylindrical side of each of the binding portion 402.

Figure 12:
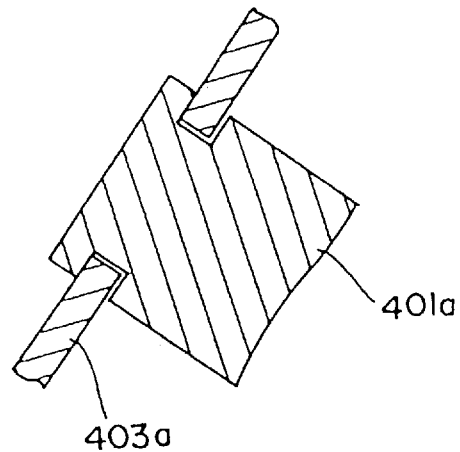
FIG. 12 is a sectional view showing a main part of a freely oscillating attached portion between the binding portion of the middle handrail connecting metal and the branch portion, both of which are shown in FIG. 9.

As shown in FIG. 12, at least one of the binding portion 402 is attached to the tip of the trifid portion 401 in a freely oscillating condition. In the present embodiment, the binding portion 402a connected to the upper handrail 5 is attached in a freely oscillating condition.

In this embodiment, the downward branch portion 401c is secured to the bottom plate 403c of the lower binding portion 402c by welding or the like. The bottom plate 403b of the binding portion 402b on the right in FIG. 10 is secured to the branch portion 401b by welding or the like.

Also, the bottom 403a of the binding portion 402a on the left in FIG. 10 is secured to the branch portion 401a in a freely oscillating condition as shown in FIG. 12.

The binding portion 402a is so designed to oscillate free with respect to the branch portion 401a. Specifically, the binding portion 402a can move and rotate freely with respect to the branch portion 401a.

Such structure in which the binding portion 402 is attached in oscillating free condition includes a caulking structure in which a branch portion and a binding portion are connected each other so as to produce a clearance between these, whereby these can slightly move.

Although, only the binding structure between the binding portion 402a on the left in FIG. 10 and the branch portion 401a is formed in the freely oscillating condition in the present embodiment, the binding structure between the binding portion 402b on the right in FIG. 10 and the branch portion 401b may be formed in the freely oscillating condition.

The upper and lower ends of the baluster 4 and the handrail 5 are inserted into and secured to the internal cylinder of the binding portion 402 formed in the above manner so that the baluster 4 and the handrails 5 are connected to each other via the present metal.

As shown in FIG. 11, each of the handrail 5 (5a, 5b) is provided with an end formed in a cylindrical shape so that the end can be inserted into the binding portions 402a, 402b. Also, the upper end of each baluster 4 is formed in a cylindrical shape for insertion into the downward cylindrical binding portion.

The implementation method for connecting the baluster 4 and the handrail 5 using the present handrails connecting metal 400 will be illustrated with reference to FIG. 13.

First, the upper and lower ends of the adjacent handrails 5a, 5b are inserted into the binding portions 402a, 402b attached to the branch portions 401a, 401b extending longitudinally along the binding portion 402 and, at the same time, the upper end of the baluster 4 is inserted into the binding portion 402c attached to the branch portion 401c extending vertically.

The securing screw 405 is inserted into the screw hole 404 bored in the bottom plate 403 of each of the binding portion 402 and screwed into each end of the handrails 5a, 5b and baluster 4 and secured.

The baluster 4 and the adjacent upper and lower handrails 5 are interconnected by the present connecting metal 400 in this manner.

The handrail connecting metal of the present embodiment has the advantage that, since at least one of the binding portions attached to the tips of the branch portions of the trifid portion is in a freely oscillating condition, the handrails 5 are freely oscillating because the handrails 5 are connected to the binding portions formed in a freely oscillating condition. As a result, even if process deviations and assembly deviations occur in connecting the metals and handrails, these deviations can be absorbed by moving the handrail 5 so that the assembly of the spiral staircase can be implemented in accordance with the design. Also, not too much force is applied during assembly so that assembly is very easy, and a product of excellent quality can be attained without failure such as the generation of a clearance between the handrail 5 and the metals.

Also, since the present connecting metal 400 is provided with the binding portion 402 formed of a bottomed cylinder and the ends of the baluster 4 and handrails 5 are inserted into and secured to the internal cylinder, the connection of the metal to the baluster 4 and the handrails 5 can be implemented firmly with certainty. Also, since the ends of the handrails 5 and baluster 4 are inserted into the internal cylinder and are thereby shielded in the cylinder, the finishing of the ends of the handrail 5 and the like is not required, therefore the spiral staircase can be produced at low cost and good appearance.

Top handrail connecting metal

Figure 14:
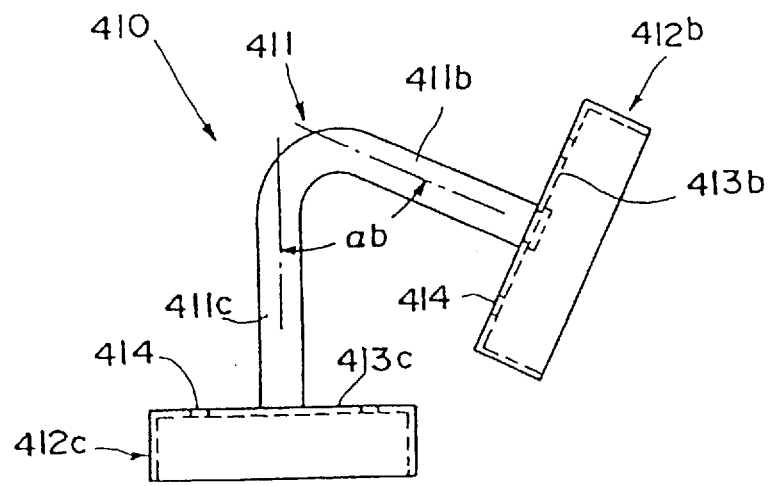
FIG. 14 is a front view of an embodiment of a connecting metal for a spiral staircase according to the present invention, showing a first embodiment of a top handrail connecting metal for connecting a handrail to a baluster, both of which are located at the uppermost position.
Figure 15:
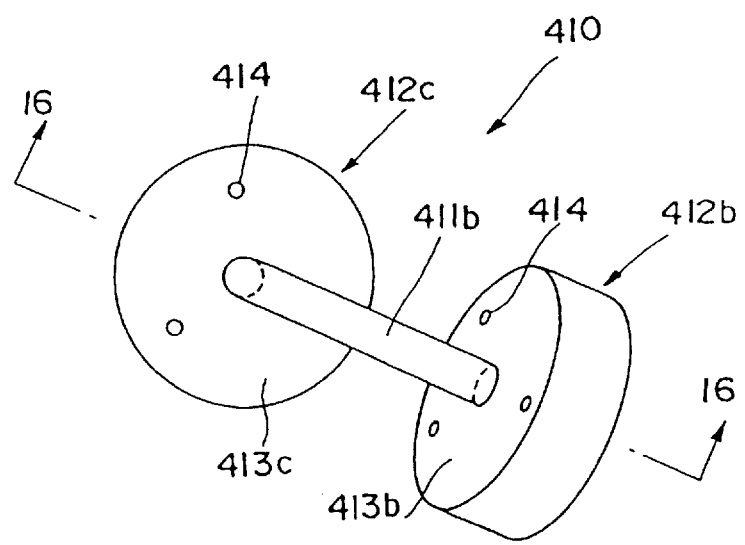
FIG. 15 is a top plan view of the top handrail connecting metal shown in FIG. 14.

FIG. 14 is a front view showing a first embodiment of a top handrail connecting metal for connecting a handrail 5u to a baluster 4u, both being located at the highest position. FIG. 15 is a top plan view of the top handrail connecting metal shown in FIG. 14.

Figure 16:
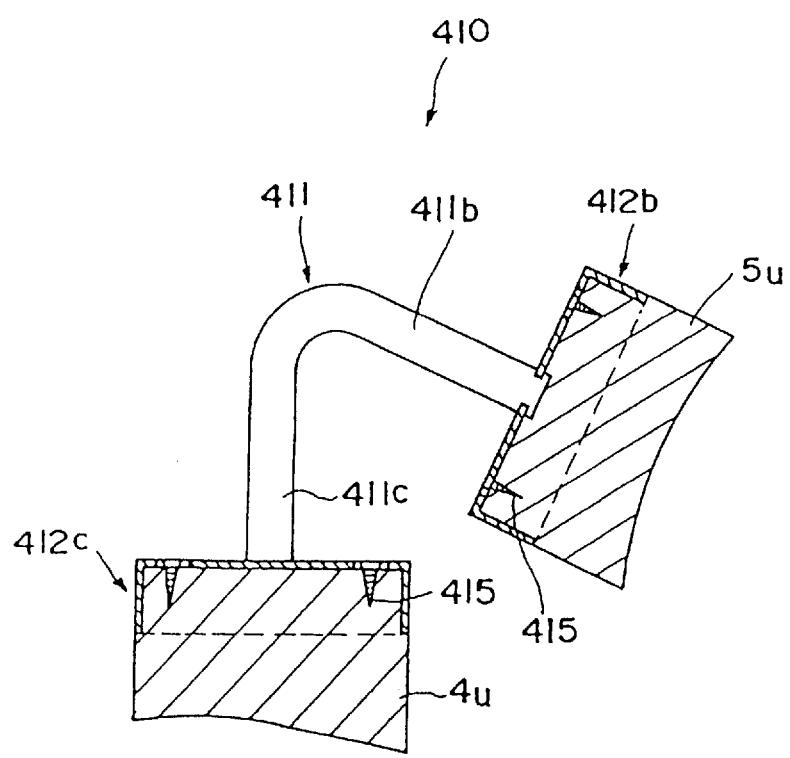
FIG. 16 is a sectional view taken along the line 16—16 in FIG. 15, showing the condition where a baluster is connected to a handrail using the top handrail connecting metal shown in FIG. 14.

Also, FIG. 16 is a sectional view taken along the line 16—16 in FIG. 15, showing the condition where the baluster 4u is connected to the handrail 5u using the top handrail connecting metal shown in FIG. 14.

As shown in these figures, the handrail connecting metal 410 of the present embodiment has a structure similar to that of the above middle handrail connecting metal except that a forked portion 411 extending in two directions is provided instead of the trifid portion 401 of the above connecting metal 400 which extends in three directions.

Specifically, the handrail connecting metal 410 is a top handrail connecting metal for connecting the top baluster 4u with the top handrail 5u, both located at the highest position among a plurality of balusters 4 and a plurality of handrails 5 in a spiral staircase, comprising a forked portion 411 (411b, 411c) consisting of shaft members which extend in two directions and binding portions 412 (412b, 412c) attached to the tips of the forked portion 411.

The forked portion 411 has a structure in which the branch portion 401a extending in a longitudinal direction is omitted from the trifid portion of the middle connecting metal 400 and, therefore, the binding portion 412 has two corresponding portions.

Other structures are similar to those of the above middle connecting metal 400 and, as shown in FIG. 14, the forked portion 411 includes two branch portions 411b, 411c made of reinforcing steel, which are bent at an angle αb similar to the case of FIG. 10.

The bottom end of the downward branch portion 411c of the forked portion 411 is welded to the center of a bottom plate 413c of the bottomed binding portion 412c. A bottom plate 413b of the bottomed binding portion 412b on the right in FIG. 14 is attached to the tip of the inclined branch portion 411b in a freely oscillating condition so that it can move and rotate freely relative to the branch portion 411b.

Also, each of the bottom plates 413b, 413c of the binding portion is provided with screw holes 414 bored for the insertion of a securing screw 415.

The top handrail connecting metal has the advantage that the top handrail 5u can be moved in the same manner as in the above middle handrail connecting metal to absorb deviations and thereby to implement the fabrication of a spiral staircase in accordance with the design. Also, not too much force is applied when assembling and implementation is very easy. Therefore a spiral staircase can be produced at low cost with good appearance.

Bottom handrail connecting metal

Figure 17:
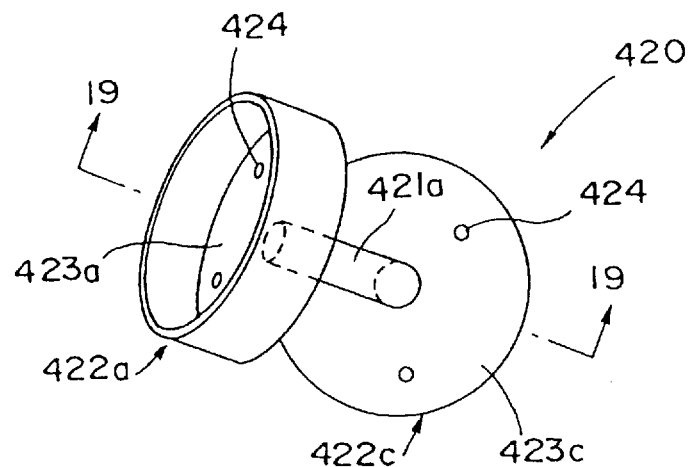
FIG. 17 is a top plan view of an embodiment of a connecting metal for a spiral staircase according to the present invention, showing a first embodiment of a bottom handrail connecting metal for connecting a handrail to a baluster, both of which are located at the lowest position.
Figure 18:
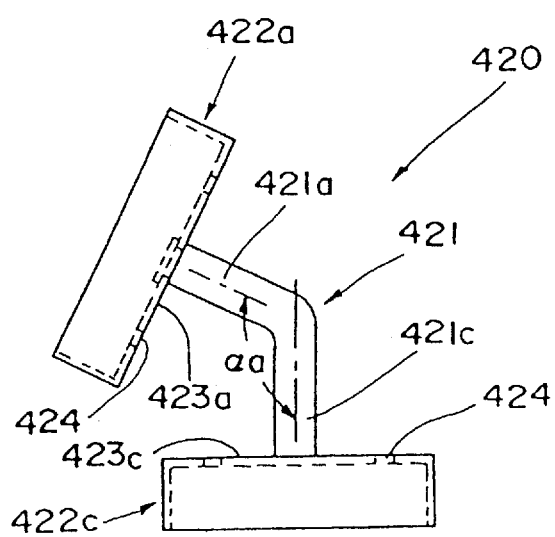
FIG. 18 is a front view of the bottom handrail connecting metal shown in FIG. 17.

FIG. 17 is a top plan view showing a first embodiment of a bottom handrail connecting metal for connecting a handrail 5d to a baluster 4d, both of which are located at the lowest position. FIG. 18 is a front view of the bottom handrail connecting metal shown in FIG. 17.

Figure 19:
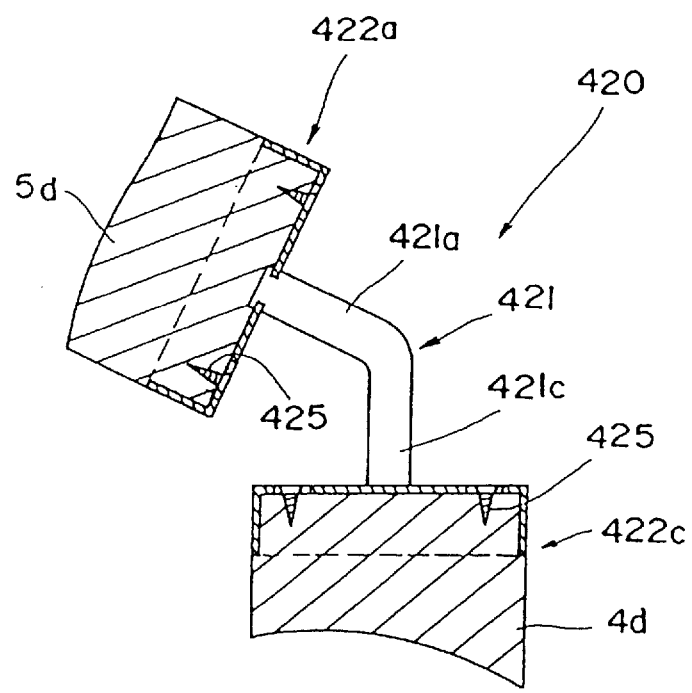
FIG. 19 is a sectional view taken along the line 19—19 in FIG. 17, showing the condition where a baluster is connected to a handrail using the bottom handrail connecting metal shown in FIG. 17.

Also, FIG. 19 is a sectional view taken along the line 19—19 in FIG. 17, showing the condition where a baluster 4d is connected to a handrail 5d using the bottom handrail connecting metal shown in FIG. 17.

As shown in these figures, the handrail connecting metal 420 of the present embodiment has a structure similar to that of the above middle handrail connecting metal except that a forked portion 421 extending in two directions is provided instead of the trifid portion 401 of the above connecting metal 400 which extends in three directions.

Specifically, the handrail connecting metal 420 is a bottom handrail connecting metal for connecting a bottom baluster 4d to a bottom handrail 5d, both of which are located at the lowest position among each of a plurality of balusters 4 and a plurality of handrails 5 in a spiral staircase, comprising a forked portion 421 (421a, 421c) including shaft members which extend in two directions and binding portions 422 (422a, 422c) attached to the tips of the forked portion 421.

The forked portion 421 has a structure in which the branch portion 401b extending in a longitudinal direction is omitted from the trifid portion of the middle connecting metal 400. Therefore, the binding portion 422 has two corresponding portions.

Other structures are similar to those of the above middle connecting metal 400 and, as shown in FIG. 17, the forked portion 421 includes two branch portions 421a, 421c made, for example, of reinforcing steel, which are bent at an angle α a similar to the case of FIG. 10.

The bottom end of the vertical branch portion 421c of the forked portion 421 is welded to the center of a bottom plate 423c of the bottomed binding portion 422c. A bottom plate 423a of the bottomed binding portion 422a on the right in FIG. 18 is attached to the tip of the inclined branch portion 421a in a freely oscillating condition so that it can move and rotate freely relative to the branch portion 421a.

Also, each of the bottom plates 423a, 423c of the binding portion is provided with screw holes 424 for the insertion of a securing screw 425.

The bottom handrail connecting metal 420 has the advantage that the top handrail 5d can be moved in the same manner as in the above middle handrail connecting metal to absorb deviations and thereby to implement the fabrication of a spiral staircase in accordance with the design. Also, not too much force is applied when assembling and implementation is very easy. Therefore a spiral staircase can be produced at low cost with good appearance.

In addition, though all of the middle, top, and bottom handrail connecting metals have binding portions 402, 412, 422 which are cylindrical in shape, these metals are not limited to those of a cylindrical shape and may have any shape depending on the shapes of the handrail 5 and baluster 4. For example, a polygonal cylindrical shape may be used.

Also, the handrail 5 and baluster 4 may have a rectangular shape in section and the ends in accordance with the shapes of the binding portion 402, 412, or 413 to connect the handrail 5 and the baluster 4 with these binding portion 402, 412, or 413.

(Second Embodiment)

Next, a second embodiment of the handrail connecting metal will be explained with reference to FIGS. 20–29.

Middle handrail connecting metal

Figure 20:
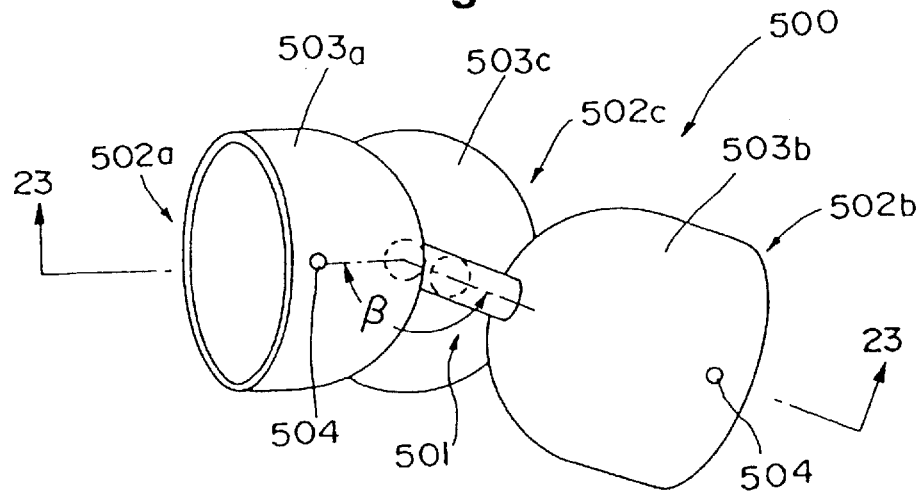
FIG. 20 is a top plan view of an embodiment of a connecting metal for a spiral staircase according to the present invention, showing a second embodiment of a middle handrail connecting metal for connecting adjacent upper and lower handrails to a baluster.
Figure 21:
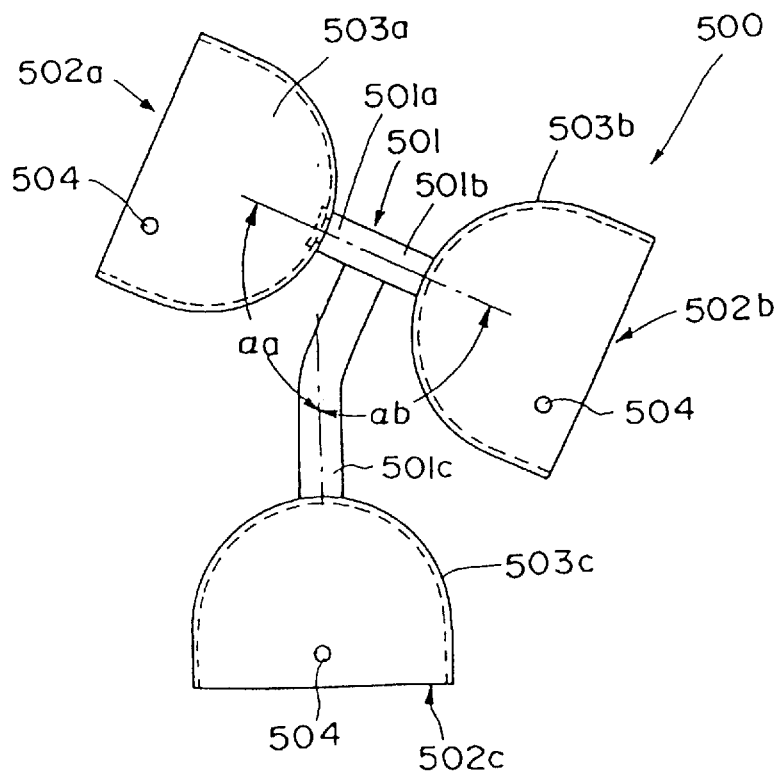
FIG. 21 is a front view of the middle handrail connecting metal shown in FIG. 20.
Figure 22:
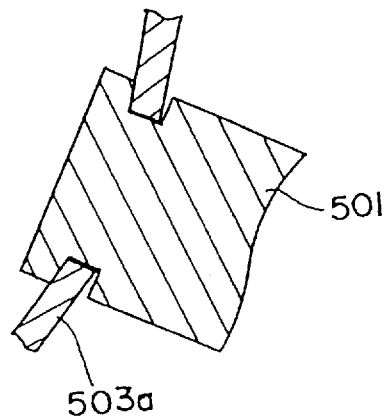
FIG. 22 is a sectional view showing a main part of a freely oscillating attached portion between the binding portion of the middle handrail connecting metal and the branch portion, both of which are shown in FIG. 20.

FIG. 20 is a top plan view showing a second embodiment of a middle handrail connecting metal for connecting adjacent upper and lower handrails 5 with the baluster 4. FIG. 21 is a front view of the middle handrail connecting metal shown in FIG. 20.

Figure 23:
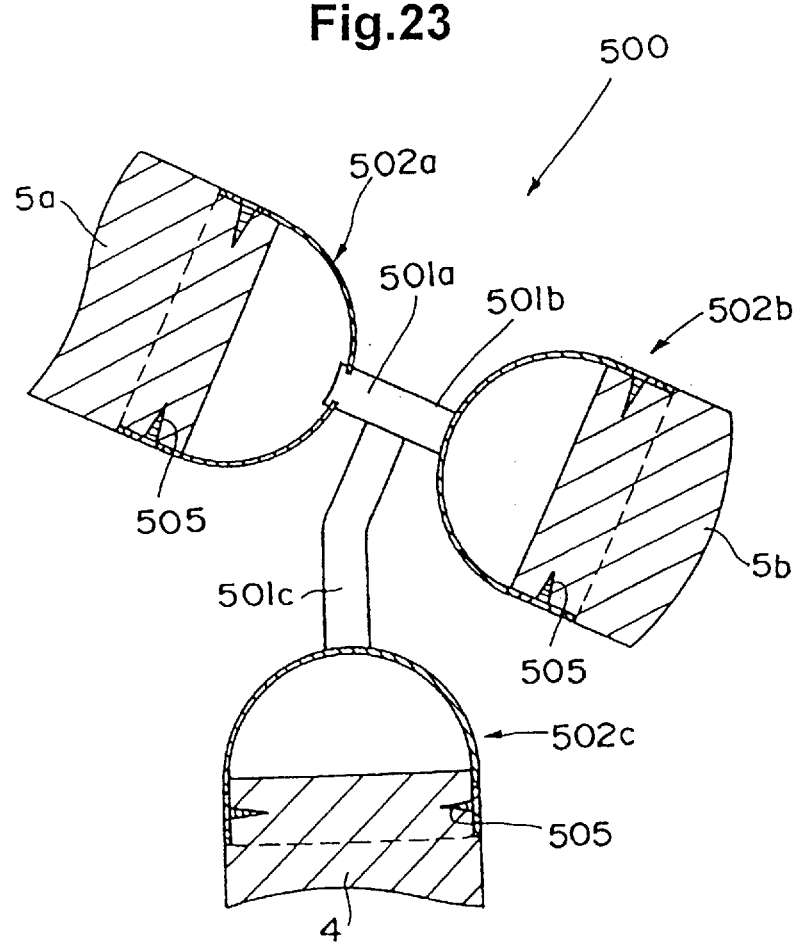
FIG. 23 is a sectional view taken along the line 23—23 in FIG. 20, showing the condition where a baluster is connected to a handrail using the middle handrail connecting metal shown in FIG. 20.

FIG. 23 is a sectional view taken along the line 23—23 in FIG. 20, showing the condition where a baluster is connected to handrails using the middle handrail connecting metal shown in FIG. 20.

As shown in these figures, a handrail connecting metal 500 in the present embodiment is a modification of the middle handrail connecting metal 400 described in the first embodiment. The handrail connecting metal 500 comprises binding portions 502 formed of a bottomed bowl with a bottom plate 503. The centers of each bottom plate 503 are attached to the tips of the branch portions 501a, 501b, 501c.

The end of each baluster 4 and adjacent handrail 5 are inserted into and secured to the internal bowls of the binding portions 502.

The middle handrail connecting metal 500 of the present embodiment is characterized in that the binding portion 502 is formed of a semi-spherical bowl. The rest of the structure is similar to the middle connecting metal 400 of the first embodiment.

The middle handrail connecting metal 500 has the advantage that, similar to the above middle handrail connecting metal of the first embodiment, the handrail 5 and the baluster 4 can be interconnected easily and firmly without damaging the appearance of the handrail 5 so that fabrication of an excellently finished spiral staircase can be implemented.

Also, because the binding portion 502 in the handrail connecting metal 500 of the present embodiment has a bowl shape, the handrail 5 can be provided with an end designed in a soft curved shape, improving the appearance of the staircase.

Top handrail connecting metal

Figure 24:
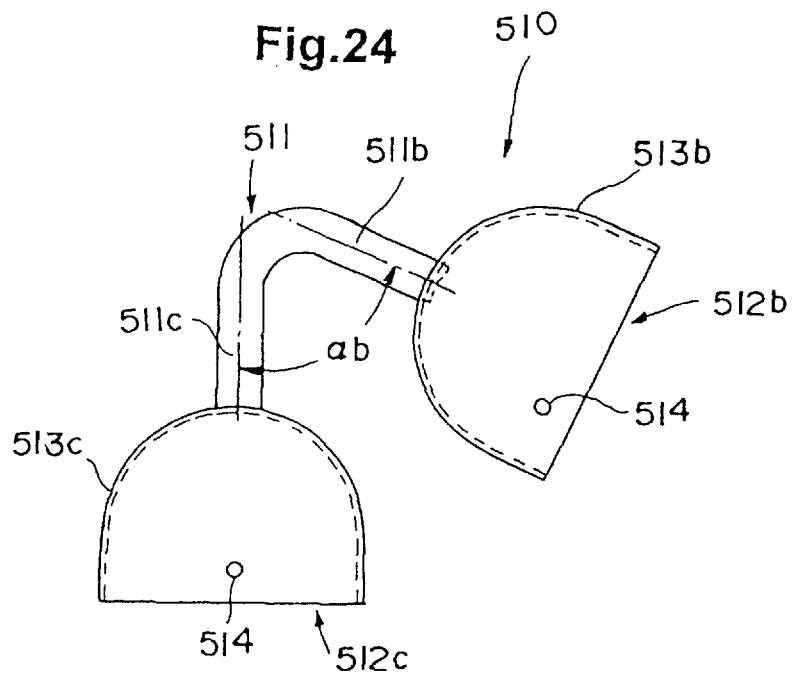
FIG. 24 is a front view of an embodiment of a connecting metal for a spiral staircase according to the present invention, showing a second embodiment of a top handrail connecting metal for connecting a handrail to a baluster, both of which are located at the uppermost position.
Figure 25:
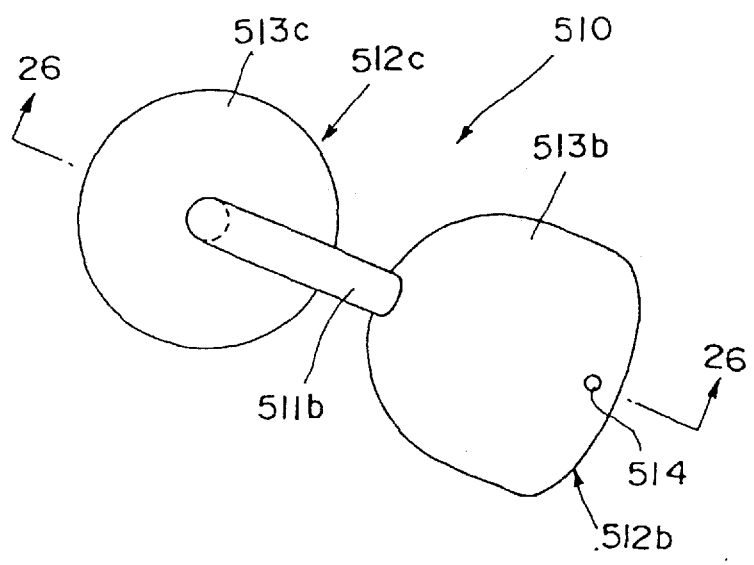
FIG. 25 is a top plan view of the top handrail connecting metal shown in FIG. 24.

FIG. 24 is a front view showing a second embodiment of a top handrail connecting metal for interconnecting a handrail 5u and a baluster 4u, both of which are located at the highest position. FIG. 25 is a top plan view of the top handrail connecting metal shown in FIG. 24.

Figure 26:
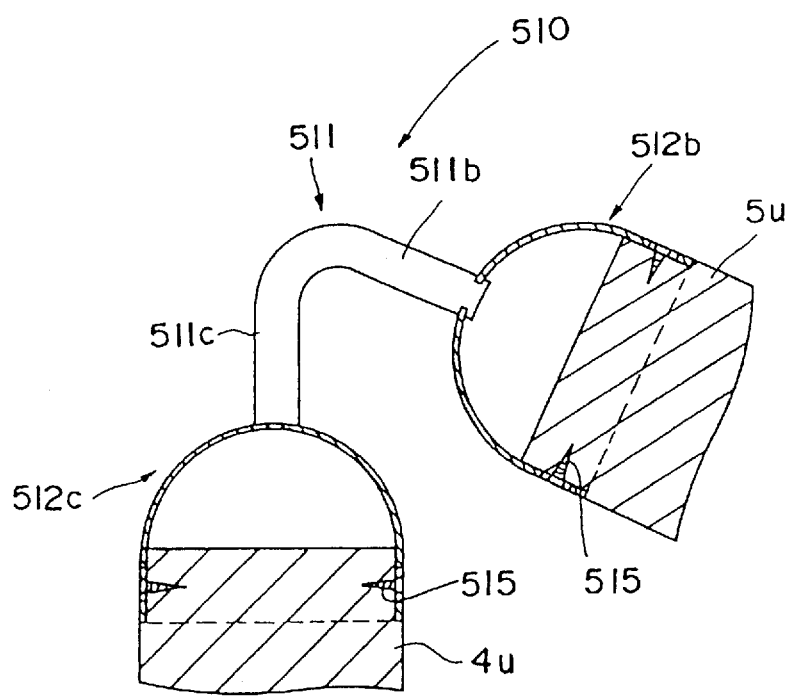
FIG. 26 is a sectional view taken along the line 26—26 in FIG. 25, showing the condition where a baluster is connected to a handrail using the top handrail connecting metal shown in FIG. 24.

FIG. 26 is a sectional view taken along the line 26—26 in FIG. 25, showing the condition where the handrail 5u and the baluster 4u which are both located at the highest position are connected together using the top handrail connecting metal shown in FIG. 24.

As shown in these figures, the handrail connecting metal 510 in the present embodiment is a modification of the top handrail connecting metal 410 described in the first embodiment. The handrail connecting metal 510 comprises binding portions 512 formed of a bottomed bowl with a bottom plate 513. The centers of each bottom plate 513 are attached to the tips of the branch portions 511b, 511c of a forked portion 511.

The ends of the top baluster 4u and the top handrail 5u are inserted into and secured to the internal bowls of the binding portions 512.

The top handrail connecting metal 510 of the present embodiment is characterized in that the binding portion 512 is formed of a semi-spherical bowl. The rest of the structure is similar to the top connecting metal 410 of the first embodiment.

The top handrail connecting metal 510 has the advantage that, similar to the above handrail connecting metal of the first embodiment, the handrail 5u and the baluster 4u can be connected together easily and firmly without damaging the appearance of the staircase. Also, because the binding portion 512 of the handrail connecting metal 510 of the present embodiment has a bowl shape, the handrail 5u can be provided with an end designed in a soft curved shape.

Bottom handrail connecting metal

Figure 27:
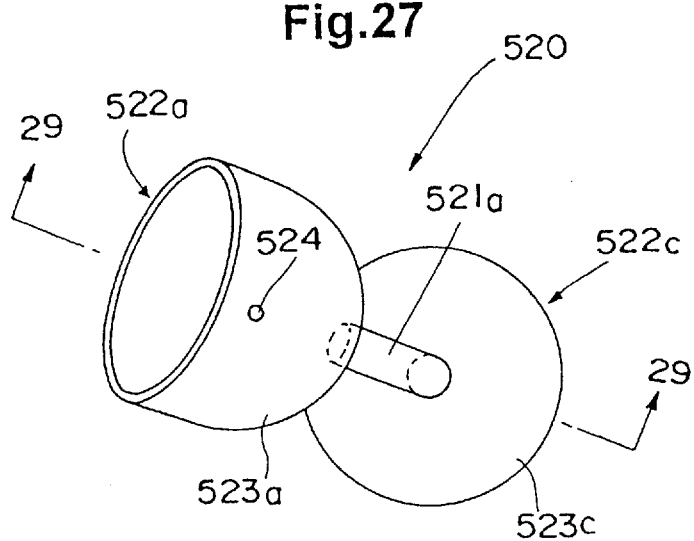
FIG. 27 is a top plan view of an embodiment of a connecting metal for a spiral staircase according to the present invention, showing a second embodiment of a bottom handrail connecting metal for connecting a handrail to a baluster, both of which are located at the lowest position.
Figure 28:
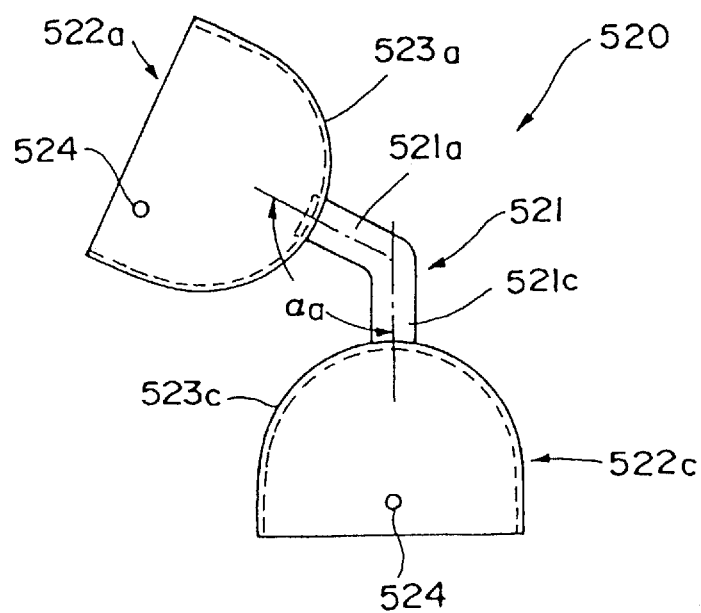
FIG. 28 is a front view of the bottom handrail connecting metal shown in FIG. 27.

FIG. 27 is a top plan view showing a second embodiment of a bottom handrail connecting metal for connecting a handrail 5d to a baluster 4d, both of which are located at the lowest position. FIG. 28 is a front view of the bottom handrail connecting metal shown in FIG. 27.

Figure 29:
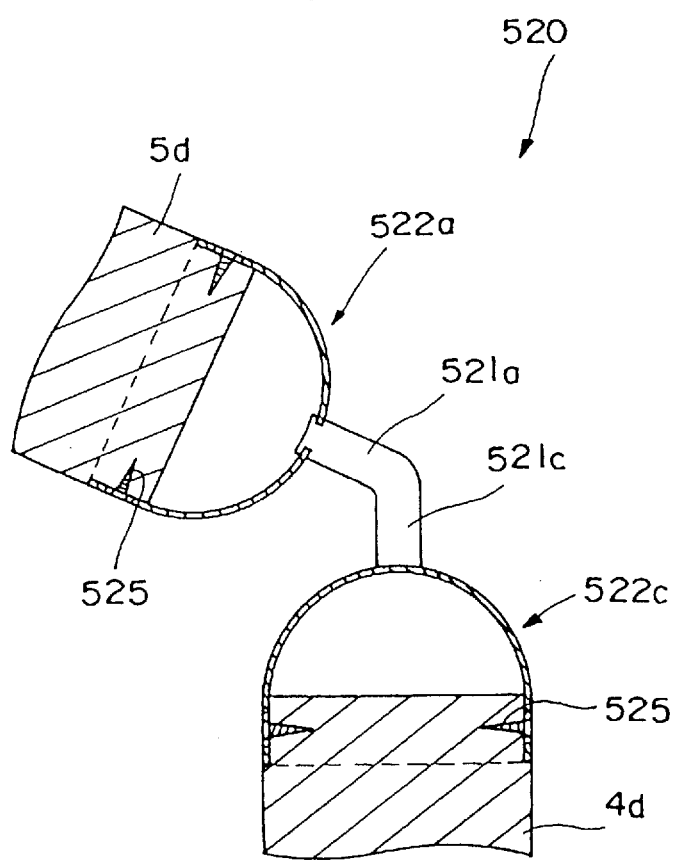
FIG. 29 is a sectional view taken along the line 29—29 in FIG. 27, showing the condition where a baluster is connected to a handrail using the bottom handrail connecting metal shown in FIG. 27.

FIG. 29 is a sectional view taken along the line 29—29 in FIG. 27, showing the condition where the bottom baluster 4d is connected to the bottom handrail 5d using the handrail connecting metal shown in FIG. 27.

As shown in these figures, a handrail connecting metal 520 in the present embodiment is a modification of the bottom handrail connecting metal 420 described in the first embodiment. The handrail connecting metal 520 comprises binding portions 522 formed of a bottomed bowl with a bottom plate 523 similar to the middle handrail connecting metal 500 and the top handrail connecting metal 510. The centers of each bottom plate 523 are attached to the tips of the branch portions 521a, 521b of a forked portion 521.

The ends of the bottom baluster 4d and the bottom handrail 5d are inserted into and secured to the internal bowls of the binding portions 522.

The bottom handrail connecting metal 520 of the present embodiment is characterized in that the binding portion 522 is formed of a semi-spherical bowl. The rest of the structure is similar to the bottom connecting metal 420 of the first embodiment.

The bottom handrail connecting metal 520 has the advantage that, similar to the above-described bottom handrail connecting metal of the first embodiment, the handrail 5d and the baluster 4d can be connected together easily and firmly without damaging the appearance of the staircase. Also, because the binding portion 522 has a bowl shape, the handrail 5u can be provided with an end designed in a soft curved shape similar to the above middle and top connecting metals 500 and 510.

(Third Embodiment)

Next, a third embodiment of handrail connecting metal will be explained with reference to FIGS. 30–39.

Middle handrail connecting metal

Figure 30:
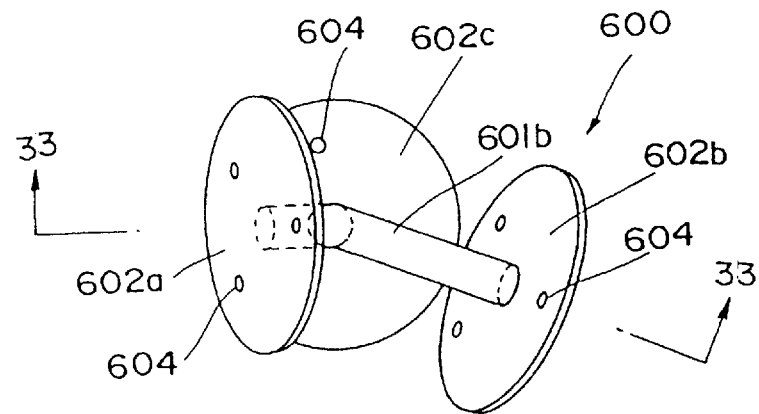
FIG. 30 is a top plan view of an embodiment of a connecting metal for a spiral staircase according to the present invention, showing a third embodiment of a middle handrail connecting metal for connecting adjacent upper and lower handrails to a baluster.
Figure 31:
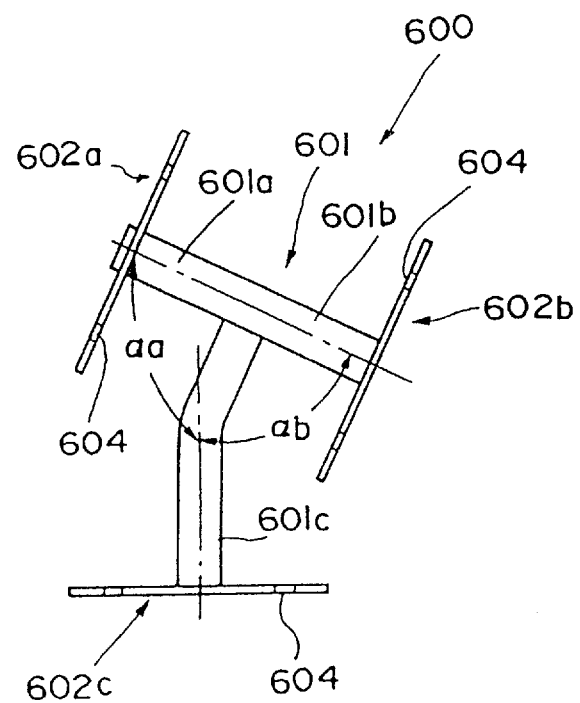
FIG. 31 is a front view of the middle handrail connecting metal shown in FIG. 30.
Figure 32:
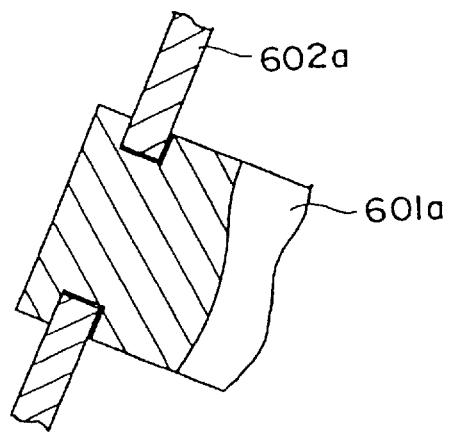
FIG. 32 is a sectional view showing a main part of a freely oscillating attached portion between the binding portion of the middle handrail connecting metal and the branch portion, both of which are shown in FIG. 30.

FIG. 30 is a top plan view showing a third embodiment of a middle handrail connecting metal for connecting adjacent upper and lower handrails 5 with the baluster 4. FIG. 31 is a front view of the middle handrail connecting metal shown in FIG. 30.

Figure 33:
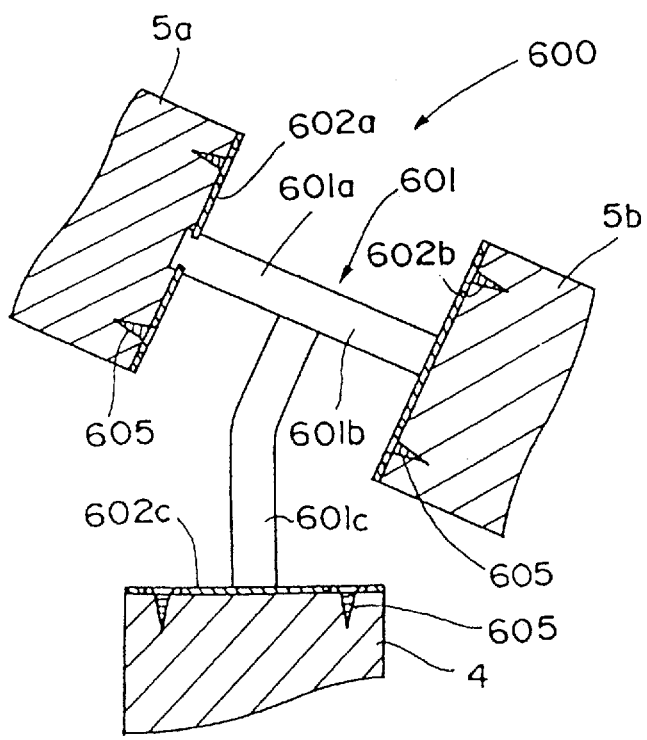
FIG. 33 is a sectional view taken along the line 33—23 in FIG. 30, showing the condition where a baluster is connected to a handrail using the middle handrail connecting metal shown in FIG. 30.

FIG. 33 is a sectional view taken along the line 33—33 in FIG. 30, showing the condition where a baluster is connected to adjacent handrails using the middle handrail connecting metal shown in FIG. 30.

As shown in these figures, a handrail connecting metal 600 in the present embodiment is a modification of the middle handrail connecting metal 400 described in the first embodiment. The handrail connecting metal 600 comprises binding portions 602 formed of a circular flat plate. The centers of the flat plates are attached to the tips of the branch portions 601a, 601b, 601c.

The ends of the baluster 4 and the adjacent handrails 5 are connected and secured to the flat plates of the binding portions 602.

The middle handrail connecting metal 600 of the present embodiment is characterized in that the binding portion 602 is formed from a flat plate. The rest of the structure is similar to the middle connecting metal 400 of the first embodiment.

The middle handrail connecting metal 600 has the advantage that, similar to the above middle handrail connecting metal of the first embodiment, the handrail 5 and the baluster 4 can be connected together easily and firmly and fabrication of an excellently finished spiral staircase can be implemented.

Also, because the binding portion 602 of the handrail connecting metal 600 of the present embodiment has a flat shape, the structure is very simple and the operation of attaching the handrail 5 and the baluster 4 is more simple. Also, the handrail connecting metal 600 can correspond to variations in the design of the ends of the handrail 5 and baluster 4, improving the beauties of the staircase.

Top handrail connecting metal

Figure 34:
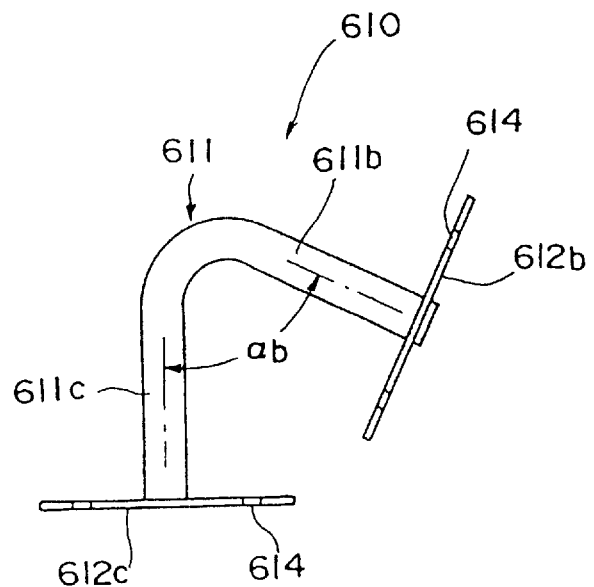
FIG. 34 is a front view of an embodiment of a connecting metal for a spiral staircase according to the present invention, showing a third embodiment of a top handrail connecting metal for connecting a handrail positioned at the uppermost portion to a baluster.
Figure 35:
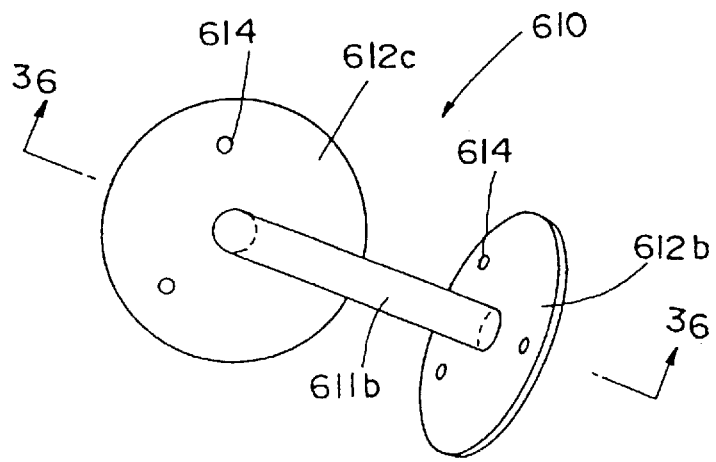
FIG. 35 is a top plan view of the top handrail connecting metal shown in FIG. 34.

FIG. 34 is a front view showing a third embodiment of a top handrail connecting metal for connecting the handrail 5u to the baluster 4u, both of which are located at the highest position. FIG. 35 is a top plan view of the top handrail connecting metal shown in FIG. 34.

Figure 36:
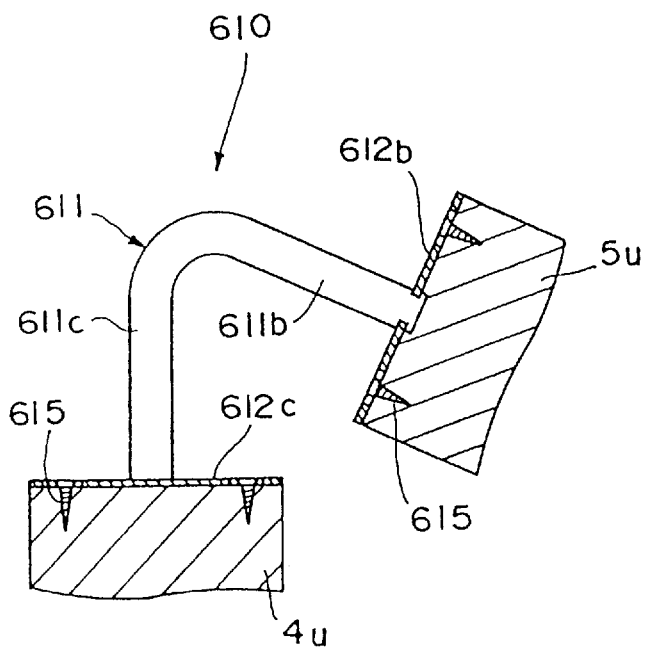
FIG. 36 is a sectional view taken along the line 36—36 in FIG. 35, showing the condition where a baluster is connected to a handrail using the top handrail connecting metal shown in FIG. 34.

FIG. 36 is a sectional view taken along the line 36—36 in FIG. 35, showing the condition where the baluster 4u and the handrail 5u which are both located at the highest position are connected to each other using the top handrail connecting metal shown in FIG. 34.

As shown in these figures, a handrail connecting metal 610 in the present embodiment is a modification of the top handrail connecting metal 410 described in the first embodiment. The handrail connecting metal 610 comprises binding portions 612 formed from a circular flat plate similar to the middle handrail connecting metal 600. The centers of each flat plate are attached to the tips of the branch portions 611b, 611c of a forked portion 611.

The ends of the top baluster 4u and the top handrail 5u are connected and secured to the flat plates of the binding portions 612.

The top handrail connecting metal 610 of the present embodiment is characterized in that the binding portion 612 is formed from a circular flat plate. The rest of the structure is similar to the top connecting metal 410 of the first embodiment.

The top handrail connecting metal of the present embodiment has the advantage that, similar to the above handrail connecting metal of the first embodiment, the handrail 5u and the baluster 4u can be connected to each other easily and firmly without damaging the appearance of the staircase. Also, because the binding portion 612 of the handrail connecting metal 610 of the present embodiment has a flat shape, it can correspond to variations in the ends of the handrail 5u and the like similar to the middle handrail connecting metal 600, improving the appearance of the staircase.

Bottom handrail connecting metal

Figure 37:
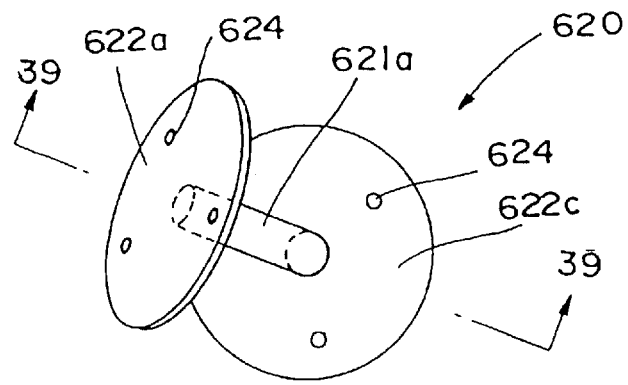
FIG. 37 is a top plan view of an embodiment of a connecting metal for a spiral staircase according to the present invention, showing a third embodiment of a bottom handrail connecting metal for connecting a handrail to a baluster, both of which are located at the lowest position.
Figure 38:
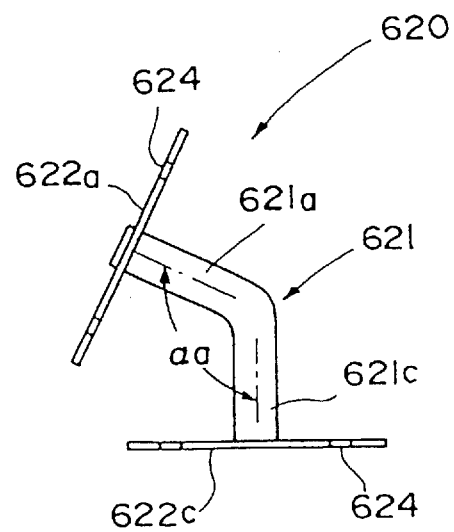
FIG. 38 is a front view of the bottom handrail connecting metal shown in FIG. 37.

FIG. 37 is a top plan view showing a third embodiment of a bottom handrail connecting metal for connecting the handrail 5d to the baluster 4d, both of which are located at the lowest position. FIG. 38 is a front view of the bottom handrail connecting metal shown in FIG. 37.

Figure 39:
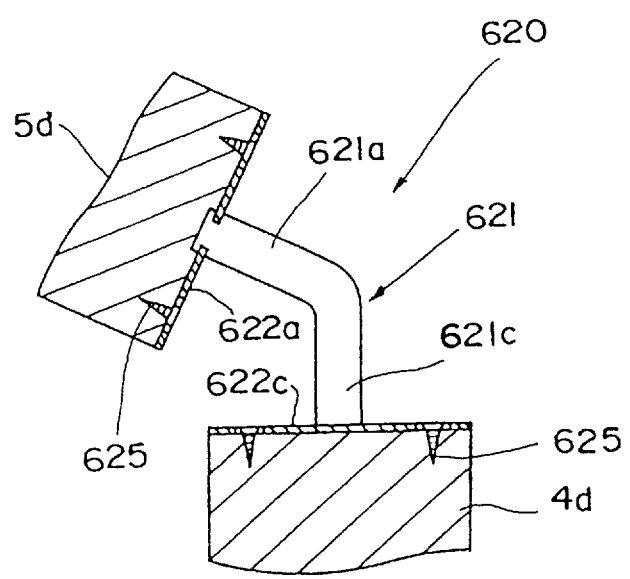
FIG. 39 is a sectional view taken along the line 39—39 in FIG. 37, showing the condition where a baluster is connected to a handrail using the bottom handrail connecting metal shown in FIG. 37.

FIG. 39 is a sectional view taken along the line 39—39 in FIG. 37, showing the condition where the baluster 4d and the handrail 5d, both of which are located at the lowest position are connected using the handrail connecting metal shown in FIG. 37.

As shown in these figures, a handrail connecting metal 620 in the present embodiment is a modification of the bottom handrail connecting metal 420 described in the first embodiment. The handrail connecting metal 620 comprises binding portions 622 formed from a circular flat plate similar to the middle handrail connecting metal 600 and the top handrail connecting metal 601. The centers of each flat plate are attached to the tips of the branch portions 621a, 621b of a forked portion 621.

The ends of the bottom baluster 4d and the bottom handrail 5d are connected and secured to the flat plates of the binding portions 622.

The bottom handrail connecting metal 620 of the present embodiment is characterized in that the binding portion 622 is formed from a circular flat plate. The rest of the structure is similar to the bottom connecting metal 420 of the first embodiment.

The bottom handrail connecting metal 620 has the advantage that, similar to the above handrail connecting metal of the first embodiment, the handrail 5d and the baluster 4d can be interconnected easily and firmly without damaging the beauties of the staircase. Also, because the binding portion 622 has a flat shape, it can correspond to variations in the design of the handrail 5d and the like similar to the above middle and top connecting metals 600 and 610, improving the appearance of the staircase.

As is clear from the above explanations, the spiral staircase and the connecting metals for the spiral staircase of the present embodiments have the advantages that the metals are used for the connection and securing of the parts constituting the staircase, such as the connection of the arm 2 to the shaft pole 1 and the securing and connection of the handrail 5 to the baluster 4. Accordingly, the spiral staircase with this structure can be simply assembled without any professional techniques and specific methods of processing.

This can solve the conventional problems of inefficiency in operations, prolonged construction period, high costs, and the like.

The connecting metal for the spiral staircase of the present embodiment is capable of holding the arm 2 firmly and connecting the arm 2 with the shaft pole 1 with certainty. Therefore, the reliability of the strength of the spiral staircase increases.

Also, because the connecting metal for the spiral staircase of the present embodiment is structurally simple, the assembly operation is simple, the connecting metal is generalized, and the connecting metal itself is easily prepared at low cost.

In addition, the spiral staircase of the present invention can be installed in all buildings whether of wooden construction or reinforcing steel construction.

INDUSTRIAL APPLICABILITY OF THE INVENTION

Using the spiral staircase and the connecting metal of the spiral staircase according to the present invention in various spiral staircases, these spiral staircases can be assembled and implemented simply and with certainty without any professional techniques and specific methods of processing. The spiral staircase and the connecting metal of the spiral staircase according to the present invention are suitably used for a spiral staircase in a wooden building such as a house.

What is claimed is:

1. A spiral staircase comprising:

a shaft pole having spirally arranged holes;

a plurality of arms connected spirally around an outer periphery of the shaft pole, each arm having holes at longitudinal end portions away from each other;

treads fixed to respective upper surfaces of the arms;

a plurality of balusters, each baluster being fixed to each outer end of the arm to be parallel to the shaft pole and having holes;

a plurality of handrails, each handrail being disposed between two balusters;

a plurality of arm connecting metals, each connecting one arm to the shaft pole;

a plurality of baluster connecting metals, each connecting one arm fixed to the shaft pole by the arm connecting metal to one baluster; and a plurality of handrail connecting metals, each connecting the baluster fixed to the arm by the baluster connecting metal to two handrails situated adjacent to each other;

wherein each of the arm connecting metal and the baluster connecting metal includes a U-shaped metal formed of upper, back and bottom portions, and having through holes formed in the upper and bottom portions; a pair of elongated bolts, each having an end portion at one side and a threaded portion at the other side, said end portions being fixed to the upper and bottom portions of the U-shaped metal and the threaded portions projecting from the back portion; and an anchor bolt to be entered into the through holes; one end of each arm being disposed between the upper and bottom portions of the arm connecting metal and fixed thereto by the anchor bolt passing through the through holes of the arm connecting metal and the hole of the arm, said elongated bolts of the arm connecting metal being inserted into the holes of the shaft pole to connect the arm to the shaft pole; the other end of each arm being disposed between the upper and bottom portions of the baluster connecting metal and fixed thereto by the anchor bolt passing through the through holes of the baluster connecting metal and the hole of the arm, said elongated bolts of the baluster connecting metal being inserted into the holes of the baluster to connect the arm to the baluster.

2. A spiral staircase according to claim 1, wherein said handrail connecting metal comprises a trifid portion including shaft members extending in three direction having a branch portion extending in a vertical direction and two branch portions extending in a longitudinal direction to cross the vertical direction at a fixed angle, the branch portions being united together in center portions; and binding portions attached to tips of the trifid portions, wherein at least one of the binding portions is pivotally attached to the tip of the trifid portion; the binding portions attached to the two branch portions extending in the longitudinal direction are secured to upper and lower ends of adjacent two handrails; the binding portion attached to the branch portion extending in the vertical direction is secured to an upper end of the baluster to connect the baluster to the adjacent upper and lower handrails.

3. A. A spiral staircase according to claim 2, wherein each binding portion of the handrail connecting metal is formed of a bottomed cylinder, a center of a bottom plate of the cylinder being attached to each of the branches of the trifid portion, one end of the baluster and the handrails being inserted into and secured to the cylinder of the binding portion.

4. A spiral staircase according to claim 2, wherein each binding portion of the handrail connecting metal is formed of a bottomed bowl, a center of a bottom plate of the bowl being attached to each of the branches of the trifid portion, one end of the baluster and the handrails being inserted into and secured to the bowl of the binding portion.

5. A spiral staircase according to claim 2, wherein each binding portion of the handrail connecting metal is formed of a flat plate, a center of the flat plate being attached to each of the branches of the trifid portion, one end of the baluster and the handrails being secured to the flat plate of the binding portion.

6. A spiral staircase according to claim 1, further comprising an end-handrail connecting metal for connecting one of highest and lowest balusters to a handrail adjacent thereto, said end-handrail connecting metal including a forked portion formed of shaft members extending in two directions and having a vertical branch portion extending in a vertical direction and a lateral branch portion extending in a longitudinal direction to cross the vertical direction at a fixed angle, the branch portions being united together in a center portion; and binding portions attached to tips of the forked portion, wherein at least one of the binding portions is pivotally attached to the tip of the forked portion; the binding portion attached to the branch portion extending in the longitudinal direction is secured to one of upper and lower ends of the handrails, and the binding portion attached to the branch portion extending in the vertical direction is secured to an upper end of the baluster to connect the baluster to the adjacent handrail.

7. A spiral staircase comprising:
a shaft pole having spirally arranged holes;
a plurality of arms connected spirally around an outer periphery of the shaft pole, each arm having holes at longitudinal end portions away from each other;
treads fixed to respective upper surfaces of the arms;
a plurality of balusters, each baluster being fixed to each outer end of the arm to be parallel to the shaft pole and having holes;
a plurality of handrails, each handrail being situated between two balusters;
a plurality of arm connecting metals, each connecting one arm to the shaft pole;
a plurality of baluster connecting metals, each connecting one arm fixed to the shaft pole by the arm connecting metal to one baluster; and
a plurality of handrail connecting metals, each connecting the baluster fixed to the arm by the baluster connecting metal to two handrails situated adjacent to each other;

wherein each of the arm connecting metal and the baluster connecting metal includes a pair of strap metals, each having a flat portion at one end with a through hole, and a threaded portion at the other end; a connecting plate integrally connected to the pair of the strap metals such that the flat portions are parallel and face each other; and an anchor bolt to be entered into the through holes; said flat portions of the pair of the strap metals in the arm connecting metal sandwiching one end of each arm and the anchor bolt passing through the through holes and the hole of the arm to fix the strap metals to the arm, said strap metals except for the flat portions being inserted into the holes of the shaft pole to connect the arm to the shaft pole; said flat portions of the pair of the strap metals in the baluster connecting metal sandwiching the other end of each arm and the anchor bolt passing through the through holes and the hole of the arm to fix the strap metals to the arm, said strap metals except for the flat portions being inserted into the holes of the baluster to connect the arm to the baluster.

8. A spiral staircase according to claim 1, wherein said handrail connecting metal comprises a trifid portion including shaft members extending in three direction having a branch portion extending in a vertical direction and two branch portions extending in a longitudinal direction to cross the vertical direction at a fixed angle, the branch portions being united together in center portions; and binding portions attached to tips of the trifid portions, wherein at least one of the binding portions is pivotally attached to the tip of the trifid portion; the binding portions attached to the two branch portions extending in the longitudinal direction are secured to upper and lower ends of adjacent two handrails; the binding portion attached to the branch portion extending in the vertical direction is secured to an upper end of the baluster to connect the baluster to the adjacent upper and lower handrails.

9. A spiral staircase according to claim 8, wherein each binding portion of the handrail connecting metal is formed of a bottomed cylinder, a center of a bottom plate of the cylinder being attached to each of the branches of the trifid portion, one end of the baluster and the handrails being inserted into and secured to the cylinder of the binding portion.

10. A spiral staircase according to claim 8, wherein each binding portion of the handrail connecting metal is formed of a bottomed bowl, a center of a bottom plate of the bowl being attached to each of the branches of the trifid portion, one end of the baluster and the handrails being inserted into and secured to the bowl of the binding portion.

11. A spiral staircase according to claim 8, wherein each binding portion of the handrail connecting metal is formed of a flat plate, a center of the flat plate being attached to each of the branches of the trifid portion, one end of the baluster and the handrails being secured to the flat plate of the binding portion.

12. A spiral staircase according to claim 7, further comprising an end-handrail connecting metal for connecting one of highest and lowest balusters to a handrail adjacent thereto, said end-handrail connecting metal including a forked portion formed of shaft members extending in two directions and having a vertical branch portion extending in a vertical direction and a lateral branch portion extending in a longitudinal direction to cross the vertical direction at a fixed angle, the branch portions being united together in a center portion; and binding portions attached to tips of the forked portion, wherein at least one of the binding portions is pivotally attached to the tip of the forked portion; the binding portion attached to the branch portion extending in the longitudinal direction is secured to one of upper and lower ends of the handrails, and the binding portion attached to the branch portion extending in the vertical direction is secured to an upper end of the baluster to connect the baluster to the adjacent handrail.

* * * * *